United States Patent
Conn et al.

(10) Patent No.: US 12,356,960 B2
(45) Date of Patent: Jul. 15, 2025

(54) PORTABLE PET BED ASSEMBLY

(71) Applicant: Ultimate Pet Bed LLC, Nottingham, NH (US)

(72) Inventors: Rick Conn, Nottingham, NH (US); Rick Harder, Boise, ID (US); Ron Wilks, Scottsdale, AZ (US)

(73) Assignee: Ultimate Pet Bed LLC, Nottingham, NH (US)

( * ) Notice: Subject to any disclaimer, the term of this patent is extended or adjusted under 35 U.S.C. 154(b) by 45 days.

(21) Appl. No.: 17/881,182

(22) Filed: Aug. 4, 2022

(65) Prior Publication Data
US 2024/0040991 A1    Feb. 8, 2024

(51) Int. Cl.
*A01K 1/035*    (2006.01)
*A01K 1/02*    (2006.01)
*A47C 19/00*    (2006.01)

(52) U.S. Cl.
CPC ............ *A01K 1/035* (2013.01); *A01K 1/0272* (2013.01); *A47C 19/005* (2013.01)

(58) Field of Classification Search
CPC .... A01K 1/035; A01K 1/0272; A01K 1/0236; A01K 1/0245; A01K 1/0353; A47D 9/016
USPC .............................. 5/95, 425, 663, 200.1, 208
See application file for complete search history.

(56) References Cited

U.S. PATENT DOCUMENTS

| | | | | |
|---|---|---|---|---|
| 494,560 A | * | 4/1893 | Floyd .................... | A47C 21/022 5/498 |
| 549,820 A | * | 11/1895 | Pursell .................... | A47D 9/016 5/310 |
| 706,316 A | * | 8/1902 | Hansell .................... | A01K 1/035 119/513 |
| 928,821 A | * | 7/1909 | Taylor .................... | A47D 9/016 5/99.1 |
| 956,913 A | * | 5/1910 | Walton .................... | A47D 9/005 5/96 |
| 1,575,241 A | * | 3/1926 | Joseph ................. | A47D 11/005 5/10.1 |
| 2,406,447 A | * | 8/1946 | Waters .................... | A47D 9/005 5/95 |
| D151,291 S | * | 10/1948 | Shoemaker .................. | D30/118 |
| 2,499,103 A | * | 2/1950 | Love .................... | A01K 1/0272 224/547 |
| 4,057,031 A | * | 11/1977 | Williams ............. | A01K 1/0353 119/28.5 |

(Continued)

*Primary Examiner* — Morgan T Jordan
*Assistant Examiner* — Angelica Alejandra Almeida Bonnin
(74) *Attorney, Agent, or Firm* — Shaddock Law Group, PC

(57) ABSTRACT

A portable pet bed assembly, having a frame assembly including a bed mount, two elbows, and a base, wherein the elbows are each slidably releasably attached or coupled between a portion of the bed mount and a portion of the base; and a pet bed having pet bed side walls and a pet bed bottom wall defining a bed cavity, wherein a bed frame recess opening is formed through a portion of the pet bed bottom wall so as to allow access to the bed frame recess through a portion of the pet bed bottom wall, wherein a pet bed bracket is positioned within a portion of the bed cavity at least partially defining a bed frame recess, wherein at least a portion of the bed frame recess is shaped to repeatably slidably receive at least a portion of the bed mount at least partially therein.

20 Claims, 17 Drawing Sheets

(56) References Cited

U.S. PATENT DOCUMENTS

| | | | | |
|---|---|---|---|---|
| 4,512,286 A * | 4/1985 | Rux | A01K 1/0272 | 119/771 |
| 4,597,359 A * | 7/1986 | Moorman | A01K 27/002 | 119/28.5 |
| 5,005,526 A * | 4/1991 | Parker | A01K 1/0272 | 119/751 |
| 5,072,694 A * | 12/1991 | Haynes | A01K 1/0353 | 119/482 |
| 5,148,561 A * | 9/1992 | Tharalson | A47C 19/22 | 5/99.1 |
| 5,277,148 A * | 1/1994 | Rossignol | A01K 1/0245 | 119/497 |
| 5,351,648 A * | 10/1994 | Elesh | E06B 7/28 | 119/28.5 |
| D376,447 S * | 12/1996 | Stump | D30/118 | |
| 5,785,003 A * | 7/1998 | Jacobson | A01K 1/0272 | 119/28.5 |
| 6,044,794 A * | 4/2000 | Raitanen | A01K 1/0353 | D21/834 |
| 6,134,731 A * | 10/2000 | Thom | A61G 7/053 | 5/426 |
| 6,564,750 B1 * | 5/2003 | Collins | A01K 1/0353 | 297/254 |
| 7,097,204 B2 * | 8/2006 | Jessup | B60P 3/39 | 5/118 |
| 8,230,818 B2 | 7/2012 | Pietra | | |
| 8,381,333 B2 * | 2/2013 | Friedman | A47D 9/016 | 5/655 |
| 8,893,661 B2 * | 11/2014 | Pietra | A01K 1/0035 | 119/485 |
| D729,986 S * | 5/2015 | Drew | D30/118 | |
| 10,226,026 B2 * | 3/2019 | Gillett | A01K 1/0353 | |
| RE47,524 E * | 7/2019 | Pietra | A01K 1/0272 | |
| 2004/0040089 A1 * | 3/2004 | Flannery | A47C 21/08 | 5/425 |
| 2007/0006808 A1 * | 1/2007 | Scatchard | A01K 1/0353 | 119/28.5 |
| 2009/0070931 A1 * | 3/2009 | DiCristofaro | A61G 7/0507 | 5/428 |
| 2009/0126638 A1 * | 5/2009 | Bennett | B60N 2/4221 | 119/28.5 |
| 2010/0018466 A1 * | 1/2010 | Austin | A01K 1/0272 | 119/28.5 |
| 2022/0095582 A1 * | 3/2022 | Allison | A01K 1/0272 | |
| 2022/0295739 A1 * | 9/2022 | Yoskowitz | A01K 1/0272 | |

* cited by examiner

PORTABLE PET BED ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of portable pet beds. More specifically, the presently disclosed systems, methods, and/or apparatuses relate to a portable pet bed assembly that allows a pet bed to be releasably attachable for connectable to a variety of frame assemblies.

2. Description of Related Art

It is quite common for pet owners to take their pets with them in their vehicles and to have their pets sleep in the same room as they do or to sleep in their bed. Typically, separate pet carriers or beds are required in each desired location.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

However, these arrangements and requirements for separate carriers or bedding have various shortcomings.

In order to overcome the shortcomings of the currently known pet carrier arrangements and/or to provide an improved portable pet bed assembly, in various exemplary, non-limiting embodiments, the portable pet bed assembly of the presently disclosed systems, methods, and/or apparatuses comprises a pet bed that can be releasably attached or coupled to a variety of frame assemblies. The frame assemblies allow the pet bed to be mounted, attached, or coupled to a variety of structures or elements, such as, for example, a vehicle seat or a bed.

In various exemplary, non-limiting embodiments, the portable pet bed assembly of the presently disclosed systems, methods, and/or apparatuses includes at least some of a frame assembly including a bed mount, two elbows, and a base, wherein the elbows are each slidably releasably attached or coupled between a portion of the bed mount and a portion of the base; and a pet bed having pet bed side walls and a pet bed bottom wall defining a bed cavity, wherein a bed frame recess opening is formed through a portion of the pet bed bottom wall so as to allow access to the bed frame recess through a portion of the pet bed bottom wall, wherein a pet bed bracket is positioned within a portion of the bed cavity at least partially defining a bed frame recess, wherein at least a portion of the bed frame recess is shaped to repeatably slidably receive at least a portion of the bed mount at least partially therein.

In various exemplary, non-limiting embodiments, the portable pet bed assembly of the presently disclosed systems, methods, and/or apparatuses includes at least some of a frame assembly including a bed mount, two elbows, and a base, wherein the bed mount comprises a bed mount connector portion having a pair of bed mount leg portions extending from opposing ends of the bed mount connector portion, wherein each of the bed mount leg portions extends such that a longitudinal axis of each bed mount leg portion extends substantially perpendicular to a longitudinal axis of the bed mount connector portion, wherein a bed mount attachment portion extends from a portion of the bed mount connector portion of the bed mount, between the bed mount leg portions of the bed mount, wherein at least a portion of a bed mount attachment projection extends through a bed mount connector aperture formed in the bed mount attachment portion of the bed mount, wherein each of the elbows extends from an elbow proximal end to an elbow distal end, wherein the elbow distal end of a first of the elbows is repeatably slidably releasably attached or coupled to a first respective opposing terminal end portion of the bed mount, wherein the elbow distal end of a second of the elbows is repeatably slidably releasably attached or coupled to a second respective opposing terminal end portion of the bed mount, wherein the base extends from a base first end to a base second end, wherein the elbow proximal end of the first of the elbows is repeatably slidably releasably attached or coupled to the base proximate the base first end, wherein the elbow proximal end of the second of the elbows is repeatably slidably releasably attached or coupled to the base proximate the base second end, and wherein the bed mount, the two elbows, and the base are assembled by slidably releasably attaching or coupling the respective elbow distal ends of the elbows to the bed mount and by slidably repeatably releasably attaching or coupling the respective elbow proximal ends of the elbows to the base; and a pet bed having pet bed side walls and a pet bed bottom wall, wherein each of the pet bed side walls extends from the pet bed bottom wall to a pet bed side wall top end, wherein a bed cavity is defined between the pet bed bottom wall and the pet bed side walls, wherein a bed frame recess opening is formed through a portion of the pet bed bottom wall so as to allow access to the bed frame recess through a portion of the pet bed bottom wall, wherein a pet bed bracket is positioned within a portion of the bed cavity, proximate and surrounding at least a portion of the bed frame recess opening, wherein the pet bed bracket at least partially defines a bed frame recess between an exterior portion of a pet bed pet bed side wall and an interior portion of the pet bed bracket, wherein at least a portion of the bed frame recess is shaped to repeatably slidably receive at least a portion of the bed mount of the frame assembly at least partially therein, and wherein a bed frame recess aperture is formed through the pet bed side wall such that if a portion of the bed mount is appropriately seated within the bed frame recess the bed mount attachment projection of the bed mount is aligned with the bed frame recess aperture such that at least a portion of the bed mount attachment projection is able to protrude into or through at least a portion of the bed frame recess aperture such that interaction between the bed mount attachment projection and the bed frame recess aperture prohibits withdrawal of the portion of the bed mount from the bed frame recess.

In various exemplary, non-limiting embodiments, each of the bed mount, the one or more elbows, and the base comprise a portion of substantially rectangular tubular material.

In various exemplary, non-limiting embodiments, an elbow attachment aperture is formed through at least one side wall of the elbows proximate a terminal end portion of the elbow proximal end, wherein an elbow attachment aperture is formed through at least one side wall of the elbows proximate a terminal end portion of the elbow distal end, wherein a bed mount attachment aperture is formed through at least one side wall of the bed mount proximate each of the terminal end portions of the bed mount, wherein each elbow attachment aperture is formed such that if a portion of a terminal end of an elbow is appropriately seated within the corresponding bed mount leg portion of the bed mount, one of the elbow attachment apertures of the elbow is aligned with one of the bed mount attachment apertures such that at least a portion of an elbow attachment projection is able to at least partially protrude from a corresponding one of the elbow attachment apertures and into or through at least a portion of the aligned one of the elbow attachment apertures and one of the bed mount attachment apertures to impede or prevent withdrawal of the elbow from the bed mount.

In various exemplary, non-limiting embodiments, a base attachment aperture is formed through at least one side wall of the base proximate a terminal end portion of the base first end and wherein a base attachment aperture is formed through at least one side wall of the base proximate a terminal end portion of the base second end, wherein each base attachment aperture is formed such that if a portion of a terminal end of the base is appropriately seated within the elbow proximal end of one of the elbows, the base attachment aperture of the base is aligned with the elbow attachment aperture of the elbow such that if a portion of the base is appropriately seated within the elbow at least a portion of an elbow attachment projection is able to at least partially protrude from a corresponding one of the elbow attachment apertures and into or through at least a portion of the aligned base attachment aperture of the base to impede or prevent withdrawal of the elbow from the base.

In various exemplary, non-limiting embodiments, each elbow provides a substantially 90° transition between the elbow proximal end and the elbow distal end.

In various exemplary, non-limiting embodiments, each elbow provides an obtuse or acute angular transition between the elbow proximal end and the elbow distal end.

In various exemplary, non-limiting embodiments, the base comprises a substantially U-shaped portion of material extending from the base first end to a base connector portion and from the base connector portion to the base second end.

In various exemplary, non-limiting embodiments, the elbow proximal end is sized and shaped so as to receive at least a portion of a terminal end portion of the base at least partially therein.

In various exemplary, non-limiting embodiments, the elbow distal end is sized and shaped so as to be at least partially received within at least a portion of a terminal end portion of the bed mount leg portion of the bed mount.

In various exemplary, non-limiting embodiments, adjacent pairs of the one or more pet bed side walls are attached or coupled via a corner element.

In various exemplary, non-limiting embodiments, one or more interior portions of the bed frame recess are formed to contact at least a portion of an outer surface of the bed mount if the bed mount is at least partially inserted into the bed frame recess and further limit how far the bed mount can be inserted into the portable pet bed assembly.

In various exemplary, non-limiting embodiments, the bed mount attachment projection comprises a spring biased button.

In various exemplary, non-limiting embodiments, the portable pet bed assembly also includes a pet bed liner sized and shaped so as to be nested within at least a portion of the bed cavity.

In various exemplary, non-limiting embodiments, interaction between the bed mount attachment projection and the bed frame recess aperture prohibits withdrawal of the portion of the bed mount from the bed frame recess unless the bed mount attachment projection is urged from the bed frame recess aperture.

In various exemplary, non-limiting embodiments, the portable pet bed assembly of the presently disclosed systems, methods, and/or apparatuses includes at least some of a frame assembly including a bed mount, two elbows, and a base, wherein the bed mount comprises a bed mount connector portion having a pair of bed mount leg portions extending from opposing ends of the bed mount connector portion, wherein a bed mount attachment portion extends from a portion of the bed mount connector portion of the bed mount, wherein at least a portion of a bed mount attachment projection extends through a bed mount connector aperture formed in the bed mount attachment portion of the bed mount, wherein each of the elbows extends from an elbow proximal end to an elbow distal end, wherein the elbow distal end of a first of the elbows is slidably releasably attached or coupled to a first respective opposing terminal end portion of the bed mount, wherein the elbow distal end of a second of the elbows is slidably releasably attached or coupled to a second respective opposing terminal end portion of the bed mount, wherein the elbow proximal end of the first of the elbows is slidably releasably attached or coupled to the base proximate a base first end of the base, wherein the elbow proximal end of the second of the elbows is slidably releasably attached or coupled to the base proximate a base second end of the base, and wherein the bed mount, the two elbows, and the base are assembled by slidably releasably attaching or coupling the respective elbow distal ends of the elbows to the bed mount and by slidably repeatably releasably attaching or coupling the respective elbow proximal ends of the elbows to the base; and a pet bed having pet bed side walls and a pet bed bottom wall defining a bed cavity, wherein a bed frame recess opening is formed through a portion of the pet bed bottom wall so as to allow access to the bed frame recess through a portion of the pet bed bottom wall, wherein a pet bed bracket is positioned within a portion of the bed cavity at least partially defining a bed frame recess, wherein at least a portion of the bed frame recess is shaped to repeatably slidably receive at least a portion of the bed mount of the frame assembly at least partially therein, and wherein a bed frame recess aperture is formed through the pet bed side wall such that if a portion of the bed mount is appropriately seated within the bed frame recess the bed mount attachment projection of the bed mount is aligned with the bed frame recess aperture such that at least a portion of the bed mount attachment projection is able to protrude into or through at least a portion of the bed frame recess aperture such that interaction between the bed mount attachment projection and the bed frame recess aperture prohibits withdrawal of the portion of the bed mount from the bed frame recess.

In various exemplary, non-limiting embodiments, the portable pet bed assembly of the presently disclosed systems, methods, and/or apparatuses includes at least some of a frame assembly including a bed mount, two elbows, and a base, wherein the bed mount comprises a bed mount connector portion having a pair of bed mount leg portions extending from opposing ends of the bed mount connector portion, wherein a bed mount attachment portion extends from a portion of the bed mount connector portion of the bed mount, wherein at least a portion of a bed mount attachment projection extends through a bed mount connector aperture formed in the bed mount attachment portion of the bed mount, wherein each of the elbows extends from an elbow proximal end to an elbow distal end, wherein the elbow distal end of a first of the elbows extends from a first respective opposing terminal end portion of the bed mount, wherein the elbow distal end of a second of the elbows extends from a second respective opposing terminal end portion of the bed mount, wherein the elbow proximal end of the first of the elbows extends from the base proximate a base first end of the base, wherein the elbow proximal end of the second of the elbows extends from the base proximate a base second end of the base, wherein the bed mount, the two elbows, and the base are assembled by slidably releasably attaching or coupling the respective elbow distal ends of the elbows to the bed mount and by slidably repeatably releasably attaching or coupling the respective elbow proximal ends of the elbows to the base, and wherein the frame assembly is formed of a unitary body or is a one-piece article; and a pet bed having pet bed side walls and a pet bed bottom wall defining a bed cavity, wherein a bed frame recess opening is formed through a portion of the pet bed bottom wall so as to allow access to the bed frame recess through a portion of the pet bed bottom wall, wherein a pet bed bracket is positioned within a portion of the bed cavity at least partially defining a bed frame recess, wherein at least a portion of the bed frame recess is shaped to repeatably slidably receive at least a portion of the bed mount of the frame assembly at least partially therein, and wherein a bed frame recess aperture is formed through the pet bed side wall such that if a portion of the bed mount is appropriately seated within the bed frame recess the bed mount attachment projection of the bed mount is aligned with the bed frame recess aperture such that at least a portion of the bed mount attachment projection is able to protrude into or through at least a portion of the bed frame recess aperture such that interaction between the bed mount attachment projection and the bed frame recess aperture prohibits withdrawal of the portion of the bed mount from the bed frame recess unless the bed mount attachment projection is urged from the bed frame recess aperture.

Accordingly, the portable pet bed assembly of the present disclosure separately and optionally provides a quick-release pet bed and frame assembly.

The portable pet bed assembly of the present disclosure separately and optionally provides a portable pet bed, which is capable of being repeatably slidably releasably attached or coupled to a variety of frame assemblies.

The portable pet bed assembly of the present disclosure separately and optionally provides a portable pet bed, which can be releasably secured to a portion of the vehicle seat using the lap belt and/or shoulder belt associated with the vehicle seat.

The portable pet bed assembly of the present disclosure separately and optionally provides a portable pet bed, which can be releasably secured between a mattress support and a mattress.

The portable pet bed assembly of the present disclosure separately and optionally provides a portable pet bed that can be released from a frame assembly.

The portable pet bed assembly of the present disclosure separately and optionally provides a portable pet bed assembly, which is simple to operate.

The portable pet bed assembly of the present disclosure separately and optionally provides a portable pet bed assembly, which allows a user to attach or couple frame assemblies to various structures or elements and slidably repeatably releasably attach or couple a pet bed to the various frame assemblies.

The presently disclosed systems, methods, and/or apparatuses separately and optionally provide a portable pet bed assembly that allows a user to transfer a single pet bed between a variety of frame assemblies.

These and other aspects, features, and advantages of the presently disclosed systems, methods, and/or apparatuses are described in or are apparent from the following detailed description of the exemplary, non-limiting embodiments of the presently disclosed systems, methods, and/or apparatuses and the accompanying figures. Other aspects and features of embodiments of the presently disclosed systems, methods, and/or apparatuses will become apparent to those of ordinary skill in the art upon reviewing the following description of specific, exemplary embodiments of the presently disclosed systems, methods, and/or apparatuses in concert with the figures. While features of the presently disclosed systems, methods, and/or apparatuses may be discussed relative to certain embodiments and figures, all embodiments of the presently disclosed systems, methods, and/or apparatuses can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the presently disclosed systems, methods, and/or apparatuses.

Any benefits, advantages, or solutions to problems that are described herein with regard to specific embodiments are not intended to be construed as a critical, required, or essential feature(s) or element(s) of the presently disclosed systems, methods, and/or apparatuses of the claims.

BRIEF DESCRIPTION OF THE SEVERAL VIEWS OF THE DRAWINGS

As required, detailed exemplary embodiments of the presently disclosed systems, methods, and/or apparatuses are disclosed herein; however, it is to be understood that the disclosed embodiments are merely exemplary of the presently disclosed systems, methods, and/or apparatuses that may be embodied in various and alternative forms, within the scope of the presently disclosed systems, methods, and/or apparatuses. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the presently disclosed systems, methods, and/or apparatuses.

The exemplary embodiments of the presently disclosed systems, methods, and/or apparatuses will be described in detail, with reference to the following figures, wherein like reference numerals refer to like parts throughout the several views, and wherein.

DETAILED DESCRIPTION OF EXEMPLARY EMBODIMENTS OF THE PRESENT DISCLOSURE

Figure 1:
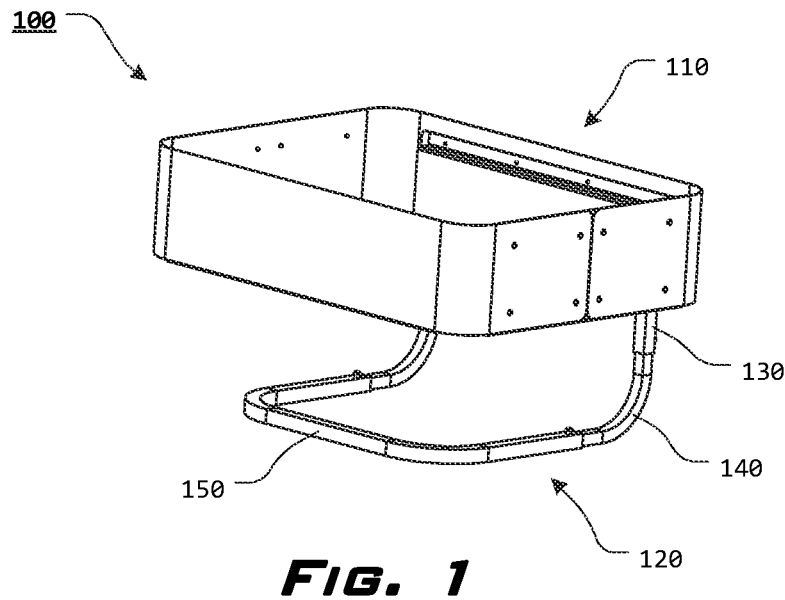
FIG. 1 illustrates an upper, left, front perspective view of an exemplary embodiment of a portable pet bed assembly, according to the presently disclosed systems, methods, and/or apparatuses.
Figure 2:
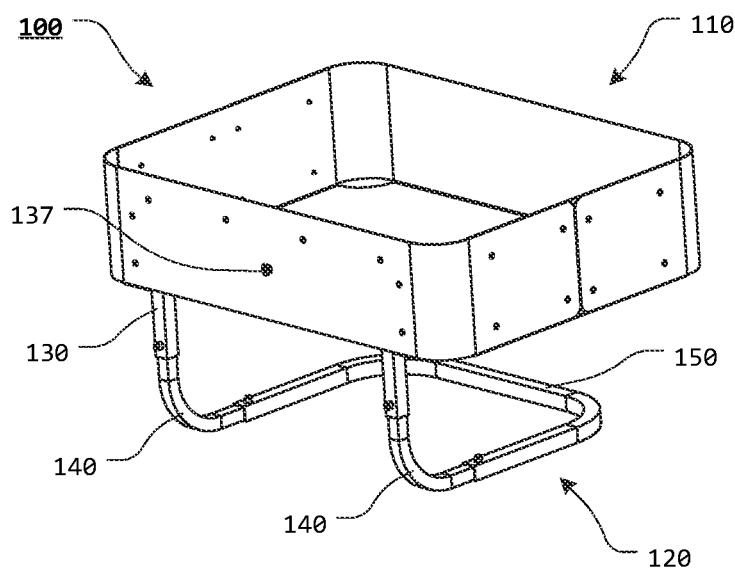
FIG. 2 illustrates an upper, left, rear perspective view of an exemplary embodiment of a portable pet bed assembly, according to the presently disclosed systems, methods, and/or apparatuses.
Figure 3:
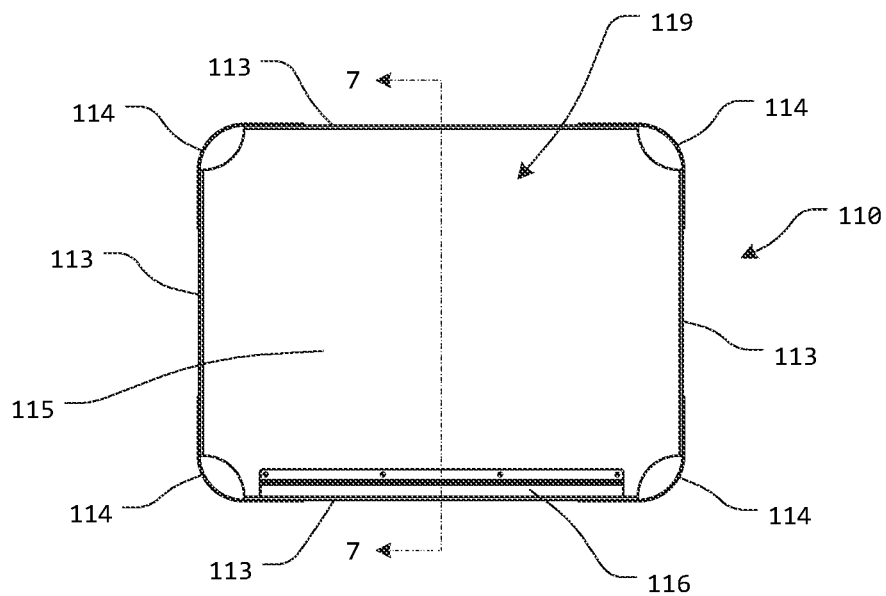
FIG. 3 illustrates a top view of an exemplary embodiment of a portable pet bed, according to the presently disclosed systems, methods, and/or apparatuses.

For simplicity and clarification, the design factors and operating principles of the portable pet bed assembly according to the presently disclosed systems, methods, and/or apparatuses are explained with reference to various exemplary embodiments of a portable pet bed assembly according to the presently disclosed systems, methods, and/or apparatuses. The basic explanation of the design factors and operating principles of the portable pet bed assembly is applicable for the understanding, design, and operation of the portable pet bed assembly of the presently disclosed systems, methods, and/or apparatuses. It should be appreciated that the portable pet bed assembly can be adapted to many applications where a portable pet bed can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the exemplary embodiments and/or elements such terms describe. Thus, these terms are not necessarily intended to indicate temporal or other prioritization of such exemplary embodiments and/or elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "portable" and "pet bed assembly" are used for a basic explanation and understanding of the operation of the systems, methods, and apparatuses of the present disclosure. Therefore, the terms "portable" and "pet bed assembly" are not to be construed as limiting the systems, methods, and apparatuses of the present disclosure.

Furthermore, it should be appreciated that, for simplicity and clarification, the embodiments of the present disclosure will be described with reference to various frame assemblies being repeatably slidably releasably attached or coupled to a vehicle seat and a bed. However, it should be appreciated that the operating principles of the disclosed portable pet bed assembly may also be employed to construct portable pet bed assemblies or components that can be permanently or repeatably slidably releasably attached or coupled to other elements or structures. Furthermore, it is also within the scope of the present disclosure that the pet bed may be utilized with a variety of other attachment elements are devices.

Turning now to the appended drawing figures, FIGS. 1-29 illustrate certain elements and/or aspects of an exemplary portable pet bed assembly 100 according to the present disclosure, while FIGS. 30-36 illustrate certain alternative exemplary elements and/or aspects of a portable pet bed assembly 100 according to the present disclosure.

In illustrative, non-limiting embodiments of the presently disclosed systems, methods, and/or apparatuses, as illustrated in FIGS. 1-29, the illustrated, exemplary portable pet bed assembly 100 includes at least some of a pet bed 110 and a frame assembly 120.

In various exemplary embodiments, the pet bed 110 comprises one or more pet bed side walls 113 attached or coupled, via corner elements 114. Each pet bed side wall 113 extends from a top end 111 to a bottom end 112. A bottom wall 115 is attached, coupled, or defined between the pet bed side walls 113, such that the pet bed side walls 113 extend upward from peripheral edges or peripheral edge portions of the bottom wall 115.

In various exemplary, nonlimiting embodiments, as illustrated, each pet bed side wall 113 is attached or coupled at or proximate a terminal end to a portion of a corner element 114. As further illustrated, the pet bed 110 is formed of two opposing pairs of pet bed side walls 113. As illustrated, one opposing pair of pet bed side walls 113 is a different length than the other opposing pair of pet bed side walls 113, thereby producing a substantially rectangular shaped pet bed 110, when viewed from a top or bottom of the pet bed 110. It should be appreciated that this is merely illustrative and not limiting and the length or shape of each of the pet bed side walls 113 is a design choice, such that the pet bed 110 may have any desired geometric shape, when viewed from the top or bottom, such as, for example, a substantially square or rectangular cross-sectional shape.

It should be noted that the pet bed side walls 113 of the pet bed 110 may generally be planar. Alternatively, the pet bed side walls 113 of the pet bed 110 may be contoured or shaped to better accommodate a specific pet to be retained within the pet bed 110.

Additionally, the number of pet bed side walls 113 is also a design choice and the pet bed 110 may be formed of three or more pet bed side walls 113, producing a pet bed 110 having a substantially triangular, pentangular, hexangular, or other desired cross-section sectional shape.

In still other exemplary, nonlimiting embodiments, the pet bed 110 may be formed of a single pet bed side wall 113.

Thus, it should be appreciated that the pet bed 110 may take the form of virtually any shape and be formed from any size, shape, number, or combination of pet bed side walls 113 or side wall portions, including, for example, a single, continuous wall portion or multiple coupled or joined wall portions.

In various exemplary, nonlimiting embodiments, the pet bed side walls 113, corner elements 114, and/or the bottom wall 115 are formed of discrete elements that are attached or coupled together to form the pet bed 110. Alternatively, the pet bed side walls 113, corner elements 114, and/or the bottom wall 115 are formed as a monolithic, integrally formed element, such that the pet bed 110 is formed of a unitary body or a one-piece article. Thus, the pet bed 110 may be provided by a single unitary structure or may optionally be provided by multiple piece construction.

A bed cavity 119 is defined between the top end 111 of the pet bed side walls 113, an interior surface portion of the pet bed side walls 113, and an interior surface portion of the bottom wall 115. The collective upper peripheral top ends 111 of the pet bed side walls 113, define the open top end of the carrier device bed cavity 119. The bed cavity 119 extends from an open top end to an interior surface portion of the bottom wall 115. Thus, the pet bed 110 defines an open top end portion extending into a bed cavity 119. The bed cavity 119 is formed by a cavity, partial cavity, space, or platform that is sized and dimensioned to accommodate a domestic pet at least partially therein.

In various exemplary embodiments, the portable pet bed assembly 100 is substantially rigid and is formed of a polymeric material such as a polymeric composite. Alternate materials of construction may include one or more of the following: wood, cardboard, steel, aluminum, titanium, and/or other metals, as well as various alloys and composites thereof, glass-hardened polymers, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset sheet materials, or the like, woven fiber, natural materials, such as, for example, leather, and/or various combinations of the foregoing.

Thus, it should be understood that the material or materials used to form the portable pet bed assembly 100 and/or various components of the portable pet bed assembly 100 is a design choice based on the desired appearance and functionality of the portable pet bed assembly 100.

In various exemplary, nonlimiting embodiments, a pet bed liner 185 is included. The pet bed liner 185 is generally sized and shaped so as to be fitted or nested within at least a portion of the bed cavity 119. In various exemplary embodiments, if the pet bed liner 185 is positioned within the bed cavity 119 an upper peripheral edge of the pet bed liner 185 is positioned at or proximate to the collective upper peripheral edges of the upstanding pet bed side walls 113 of the pet bed 110.

Figure 4:
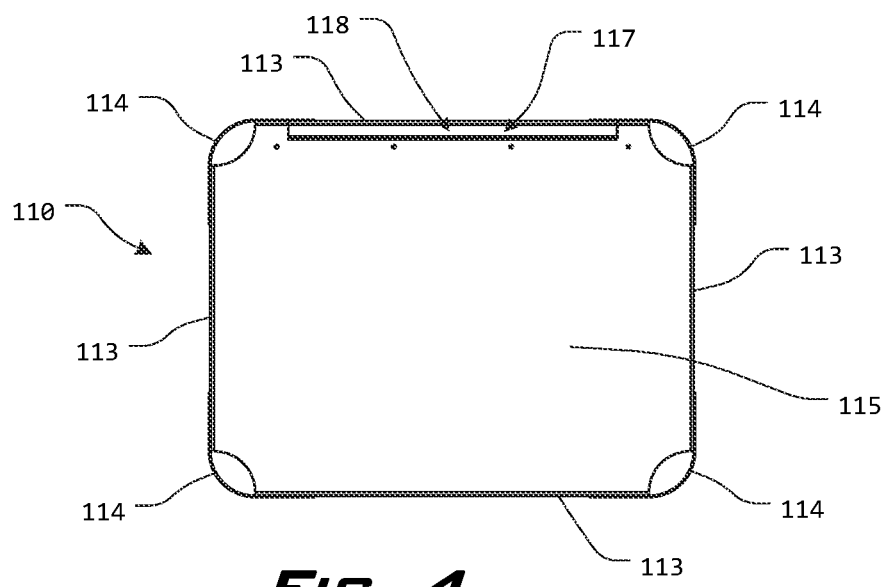
FIG. 4 illustrates a bottom view of an exemplary embodiment of a portable pet bed, according to the presently disclosed systems, methods, and/or apparatuses.
Figure 5:
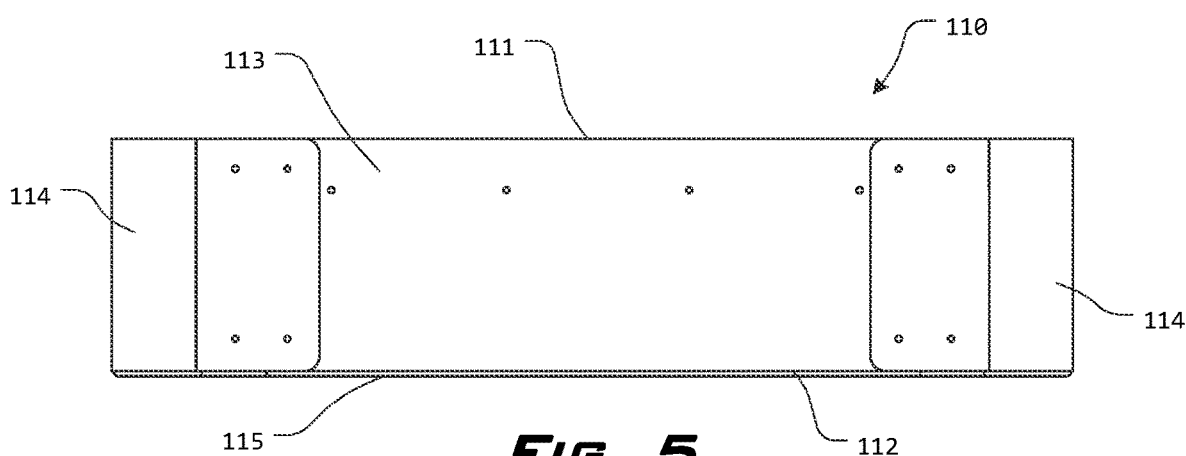
FIG. 5 illustrates a front view of an exemplary embodiment of a portable pet bed, according to the presently disclosed systems, methods, and/or apparatuses.
Figure 6:
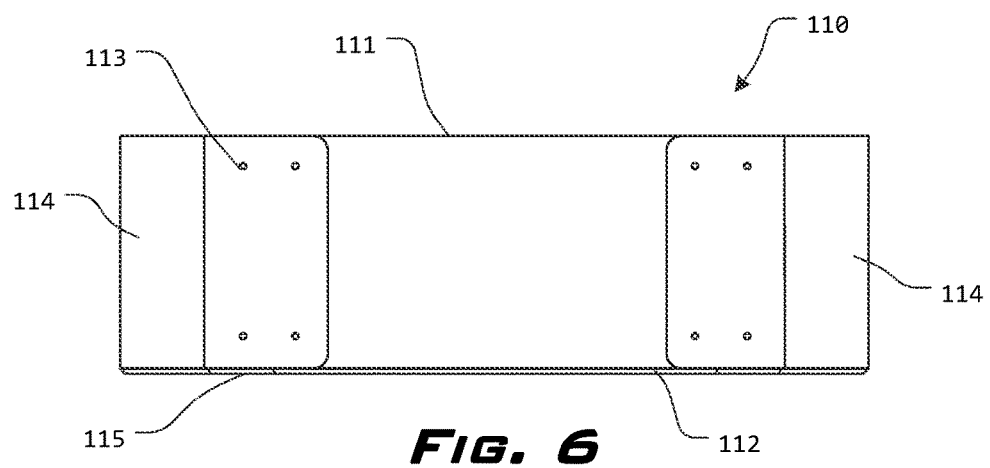
FIG. 6 illustrates a left side view of an exemplary embodiment of a portable pet bed, according to the presently disclosed systems, methods, and/or apparatuses.
Figure 7:
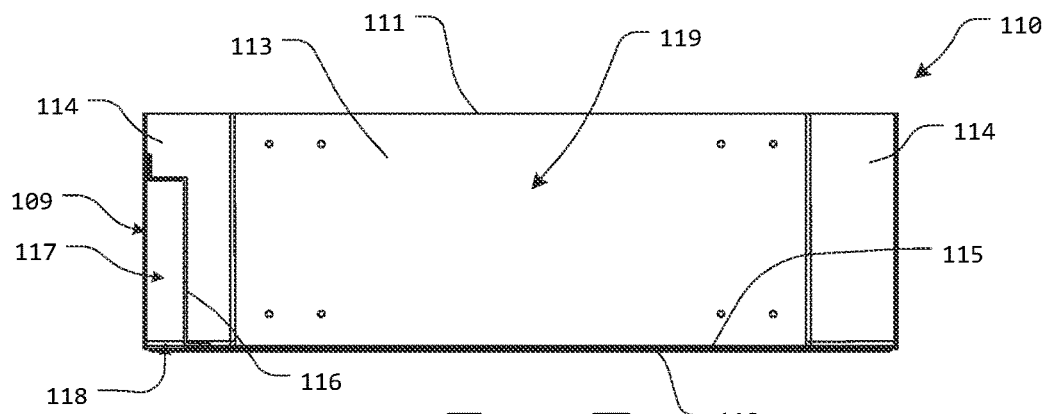
FIG. 7 illustrates a left side, cross-sectional view, taken along line 7-7 of FIG. 3, of an exemplary embodiment of a portable pet bed, according to the presently disclosed systems, methods, and/or apparatuses.
Figure 8:
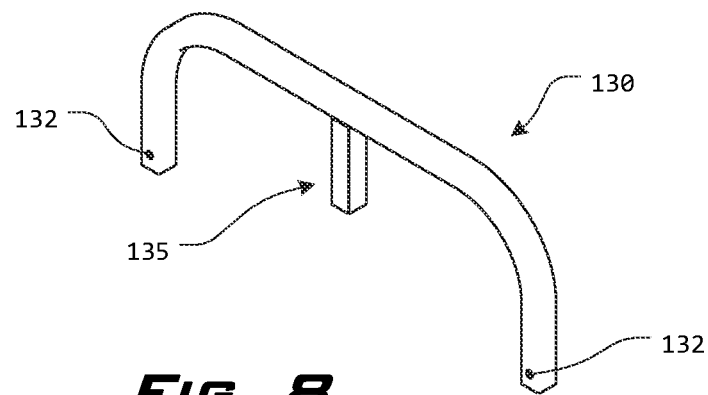
FIG. 8 illustrates an upper, perspective view of an exemplary embodiment of a bed mount, according to the presently disclosed systems, methods, and/or apparatuses.
Figure 9:
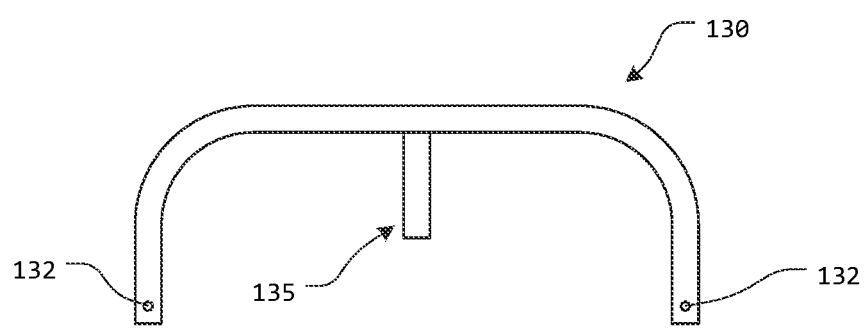
FIG. 9 illustrates a front view of an exemplary embodiment of a bed mount, according to the presently disclosed systems, methods, and/or apparatuses.

As illustrated most clearly in FIGS. 4 and 7, a bed frame recess 117 is formed through a portion of the bottom wall 115. In various exemplary embodiments, the bed frame recess 117 is formed as a recess in a peripheral edge or a peripheral edge portion of the bottom wall 115. Thus, the bed frame recess 117 is formed proximate or at an inner surface of a portion of the pet bed side wall 113.

A pet bed bracket 116 is positioned within a portion of the bed cavity 119, proximate and surrounding at least a portion of the bed frame recess opening 118. The pet bed bracket 116 is formed of a substantially rigid portion of material and is positioned so as to at least partially define a bed frame recess 117 between an exterior portion of a pet bed side wall 113 and an interior portion of the pet bed bracket 116.

The pet bed bracket 116 may be formed as an integral portion of the pet bed 110 or may be attached or coupled within the bed cavity 119.

The pet bed bracket 116 is positioned adjacent to or abutted against a portion of a pet bed side wall 113 and the bottom wall 115 to at least partially define the bed frame recess 117. The bed frame recess opening 118 is formed adjacent to or coextensive with a portion of the pet bed bracket 116 to provide an opening within the bottom wall 115, proximate a portion of the bottom end 112 of the pet bed side wall 113 to allow access to the bed frame recess 117 through a portion of the bottom wall 115.

The bed frame recess 117 provides a recess or channel having a substantially U-shaped profile. At least a portion of the U-shaped bed frame recess 117 is shaped to receive and accommodate at least a portion of the bed mount 130 of the frame assembly 120 at least partially therein. The bed frame recess 117 is shaped generally to match the exterior contours of at least a portion of the outer surface of the bed mount 130. The bed frame recess 117 is formed to contact at least a portion of the outer surface of the bed mount 130 of the inserted bed mount 130 and further limit how far the bed mount 130 can be inserted into the portable pet bed assembly 100.

The interior size and shape of the bed frame recess 117 facilitates alignment of the bed mount 130 within the bed frame recess 117 by limiting lateral or other movement of the bed mount 130 with respect to the bed frame recess 117 and the pet bed 110 without preventing a user from easily withdrawing or removing the bed mount 130 from the bed frame recess 117 and the pet bed 110.

A bed frame recess aperture 109 is formed through the pet bed side wall 113, within a portion of the bed frame recess 117. The bed frame recess aperture 109 is formed such that if the bed mount 130 is appropriately seated within the bed frame recess 117, the bed mount attachment projection 137 of the bed mount 130 is aligned with the bed frame recess aperture 109. In this manner, if the bed mount 130 is appropriately seated within the bed frame recess 117 at least a portion of the bed mount attachment projection 137 is able to engage and protrude into or through at least a portion of the bed frame recess aperture 109.

In various exemplary embodiments, at least a portion of the bed mount attachment projection 137 extends through an aperture formed in the bed mount connector portion of the bed mount 130. Alternatively, as illustrated, a bed mount attachment portion 135 extends from a portion of the bed mount connector portion of the bed mount 130. The bed mount attachment portion 135 extends between the bed mount leg portions of the bed mount 130. In these exemplary embodiments, at least a portion of the bed mount attachment projection 137 extends through a bed mount connector aperture 136 formed in the bed mount attachment portion 135 of the bed mount 130.

In various exemplary, nonlimiting embodiments, the bed mount attachment projection 137 comprises a spring biased button and the bed frame recess aperture 109 of the pet bed 110 provides a corresponding hole to provide a releasable locking arrangement between the bed mount 130 and the bed frame recess 117. Thus, the interior size and shape of the bed frame recess 117 further facilitates alignment of the bed mount attachment projection 137 with the bed frame recess aperture 109.

To facilitate portability, the pet bed 110 is configured to be easily removed from the frame assembly 120. Interaction of the bed frame recess 117 and a portion of the bed mount 130 enable simple and convenient, yet rigid and secure, mounting and dismounting of the pet bed 110 to and from the bed mount 130 of the frame assembly 120.

In various exemplary, nonlimiting embodiments, the frame assembly 120 includes at least some of a bed mount 130, one or more elbows 140, and a base 150. The bed mount 130, the one or more elbows 140, and the base 150 are attached or coupled together to form a horizontal portion 125 and a vertical portion 127.

In various exemplary embodiments, bed mount 130, the one or more elbows 140, and the base 150 each comprise a tubular portion of material, such as, for example, metal, steel, aluminum, or other square or round tubing.

The bed mount 130 generally comprises a pair of bed mount leg portions that are parallel or substantially parallel to one another. Each bed mount leg portion extends from an opposing end of a bed mount connector portion. In various exemplary embodiments, each of the bed mount leg portions extends such that a longitudinal axis of each bed mount leg portion extends substantially perpendicular to a longitudinal axis of the bed mount connector portion.

A bed mount attachment aperture 132 is formed through at least one side wall of each bed mount leg portion proximate a terminal end portion of each bed mount leg portion. Each bed mount attachment aperture 132 is formed such that if a portion of a terminal end of an elbow 140 is appropriately seated within the corresponding bed mount leg portion, an elbow attachment projection 147 of the elbow 140 is aligned with the bed mount attachment aperture 132. In this manner, if a portion of the elbow 140 is appropriately seated within the bed mount 130 at least a portion of an elbow attachment projection 147 is able to engage and protrude into or through at least a portion of the bed mount attachment aperture 132.

In various exemplary, nonlimiting embodiments, each elbow 140 comprises a portion of substantially rectangular tubular material extending from a elbow proximal end 141 to a elbow distal end 143. The elbow proximal end 141 is sized and shaped so as to receive at least a portion of a terminal end portion of a leg of the base 150 at least partially therein. The elbow distal end 143 is sized and shaped so as to be at least partially received within at least a portion of a terminal end portion of a bed mount leg portion of the bed mount 130. In various exemplary embodiments, an outer portion of the elbow distal end 143 is larger than an outer portion of the elbow proximal end 141. An elbow attachment aperture 142 is formed through at least one side wall of each bed mount leg portion proximate a terminal end portion of the elbow proximal end 141 and the elbow distal end 143.

Generally, each elbow 140 is substantially L-shaped and provides a 90° transition between the elbow proximal end 141 and the elbow distal end 143. It should be understood that in certain alternative embodiments each elbow 140 may alternatively provide an obtuse or acute angular transition between the elbow proximal end 141 and the elbow distal end 143.

Each elbow attachment aperture 142 is formed such that if a portion of a terminal end of an elbow 140 is appropriately seated within the corresponding bed mount leg portion of the bed mount 130, an elbow attachment aperture 142 of the elbow 140 is aligned with a bed mount attachment aperture 132. In this manner, if a portion of the elbow 140 is appropriately seated within the bed mount 130 at least a portion of an elbow attachment projection 147 is able to at least partially protrude from a corresponding elbow attachment aperture 142 and engage and protrude into or through at least a portion of the aligned elbow attachment aperture 142 and bed mount attachment aperture 132.

In various exemplary, nonlimiting embodiments, each elbow attachment projection 147 of an associated elbow 140 comprises a spring biased button and each associated bed mount attachment aperture 132 of the bed mount 130 provides a corresponding hole to provide a releasable locking arrangement between an associated elbow 140 and the bed mount 130. Interaction between the elbow attachment projection 147 and the bed mount attachment aperture 132 impedes or prevents withdrawal of an elbow 140 from the bed mount 130.

In various exemplary, nonlimiting embodiments, the base 150 comprises a substantially U-shaped portion of substantially rectangular tubular material extending from a base first end 151 to a base connector portion 154 and from the base connector portion 154 to a base second end 153. The base first end 151 and the base second end 153 are each sized and shaped so as to receive at least a portion of a terminal end portion of a elbow proximal end 141 of an elbow 140 at least partially therein.

A base attachment aperture 152 is formed through at least one side wall of the base 150 proximate a terminal end portion of the base first end 151 and the base second end 153.

Each base attachment aperture 152 is formed such that if a portion of a terminal end of a base 150 is appropriately seated within a corresponding elbow proximal end 141 of the elbow 140, a base attachment aperture 152 of the base 150 is aligned with an elbow attachment aperture 142 of the elbow 140. In this manner, if a portion of the base 150 is appropriately seated within the elbow 140 at least a portion of an elbow attachment projection 147 is able to at least partially protrude from a corresponding elbow attachment aperture 142 and engage and protrude into or through at least a portion of the aligned base attachment aperture 152 of the base 150.

In various exemplary, nonlimiting embodiments, each elbow attachment projection 147 comprises a spring biased button and each associated elbow attachment aperture 142 of the elbow 140 provides a corresponding hole to provide a releasable locking arrangement between an associated base attachment aperture 152 of the base 150 and the elbow 140. Interaction between the elbow attachment projection 147 and the elbow 140 impedes or prevents withdrawal of the elbow 140 from the base 150. It should be appreciated that each of the bed mount 130, the elbow 140, and the base 150 comprise portions of hollow square tubing having a respective central bore extending therethrough. At least a terminal end portion of respective portions of the bed mount 130, the elbow 140, and/or the base 150 have a respective inner or outer size, shape, and dimension so as to allow respective portions of each element to be repeatably slidably releasably attached or coupled to one another.

As illustrated most clearly in FIGS. 23-27, the frame assembly 120 is assembled by slidably repeatably releasably attaching or coupling the respective elbow distal ends 143 of the elbows 140 to the bed mount 130 and by slidably repeatably releasably attaching or coupling the respective elbow proximal ends 141 of the elbows 140 to the base 150.

Figure 37:
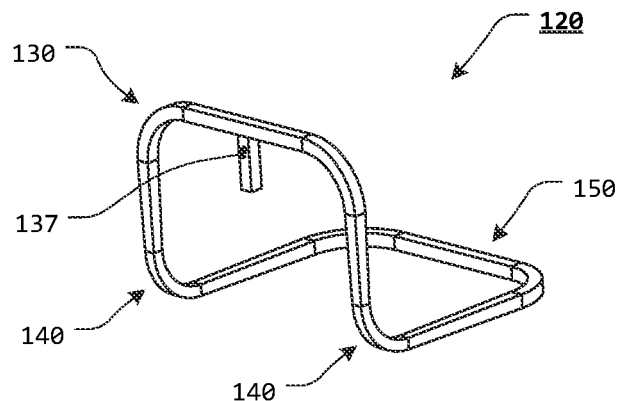
FIG. 37 illustrates an upper, rear, left, perspective view of certain exemplary components of an exemplary embodiment of a unitary frame assembly, according to the presently disclosed systems, methods, and/or apparatuses.
Figure 38:
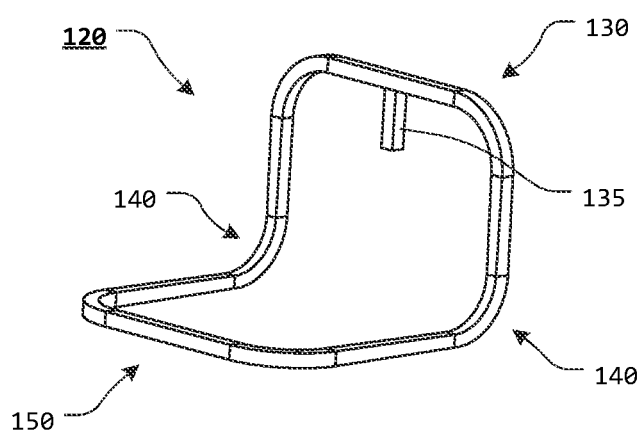
FIG. 38 illustrates an upper, front, right, perspective view of certain exemplary components of an exemplary embodiment of a unitary frame assembly, according to the presently disclosed systems, methods, and/or apparatuses.

In various exemplary embodiments, the frame assembly 120 may be formed of a unitary body or a one-piece article, as illustrated, for example, in FIGS. 37 and 38. Thus, the frame assembly 120 may be provided by a single unitary structure or may optionally be provided by multiple piece construction.

Figure 10:
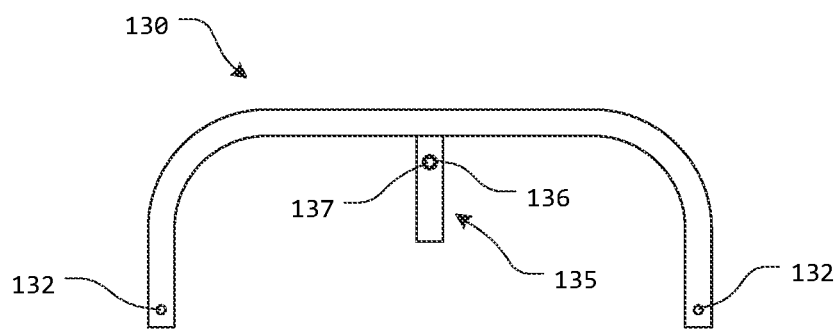
FIG. 10 illustrates a rear view of an exemplary embodiment of a bed mount, according to the presently disclosed systems, methods, and/or apparatuses.
Figure 11:
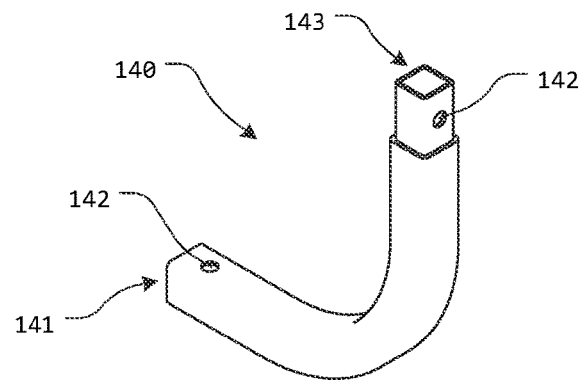
FIG. 11 illustrates an upper, perspective view of an exemplary embodiment of an elbow, according to the presently disclosed systems, methods, and/or apparatuses.
Figure 12:
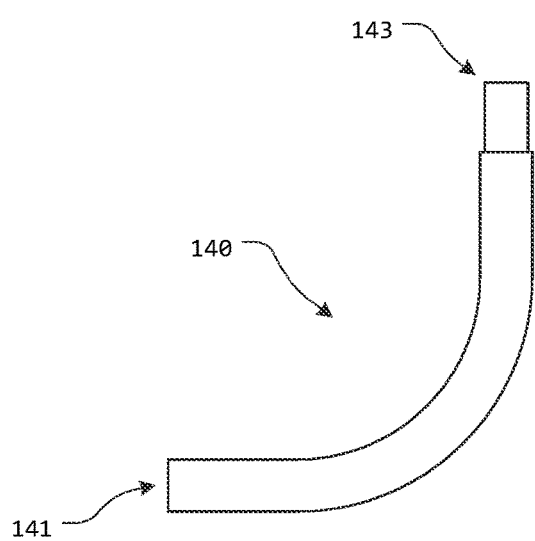
FIG. 12 illustrates a side view of an exemplary embodiment of an elbow, according to the presently disclosed systems, methods, and/or apparatuses.
Figure 13:
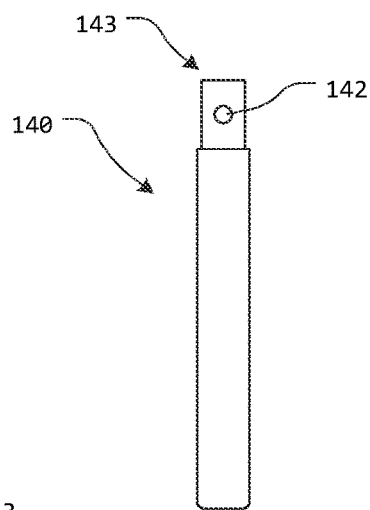
FIG. 13 illustrates a front view of an exemplary embodiment of an elbow, according to the presently disclosed systems, methods, and/or apparatuses.
Figure 14:
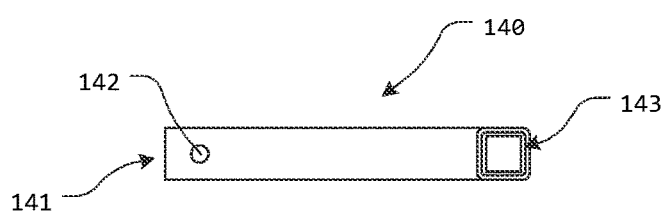
FIG. 14 illustrates a top view of an exemplary embodiment of an elbow, according to the presently disclosed systems, methods, and/or apparatuses.
Figure 15:
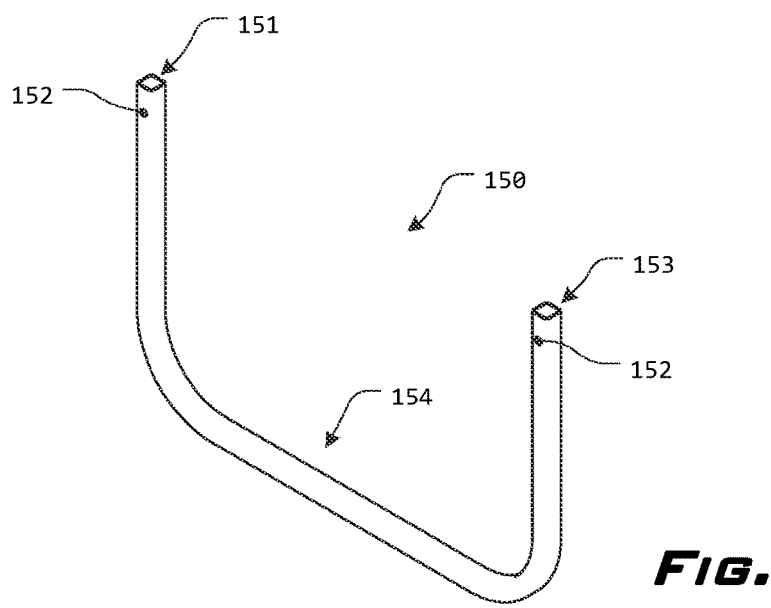
FIG. 15 illustrates an upper, perspective view of an exemplary embodiment of a base, according to the presently disclosed systems, methods, and/or apparatuses.
Figure 16:
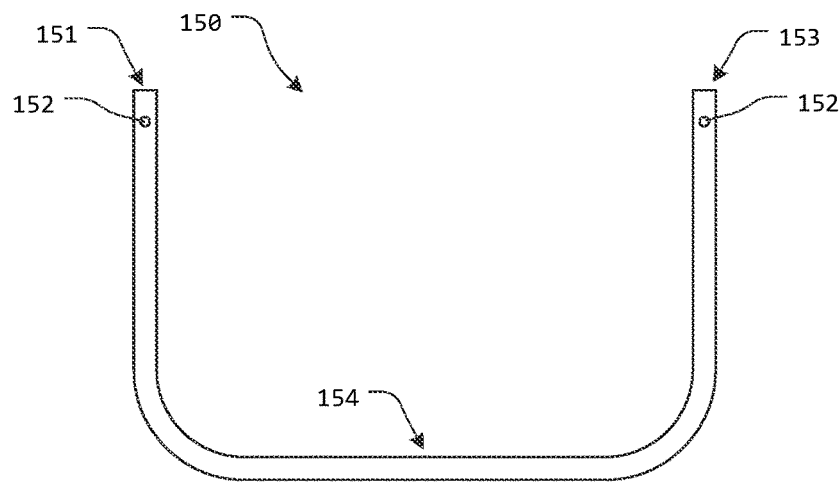
FIG. 16 illustrates a top view of an exemplary embodiment of a base, according to the presently disclosed systems, methods, and/or apparatuses.
Figure 17:
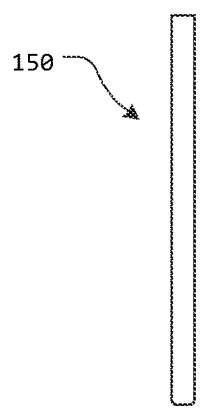
FIG. 17 illustrates a side view of an exemplary embodiment of a base, according to the presently disclosed systems, methods, and/or apparatuses.
Figure 18:
FIG. 18 illustrates a rear view of an exemplary embodiment of a base, according to the presently disclosed systems, methods, and/or apparatuses.
Figure 19:
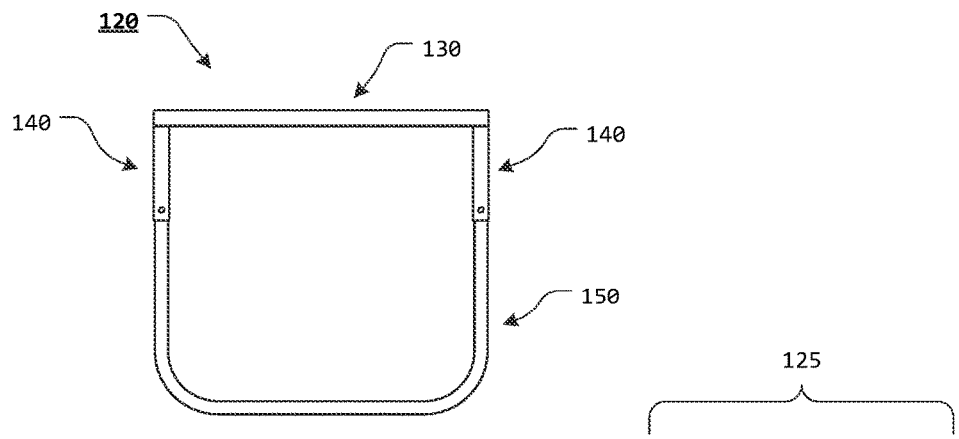
FIG. 19 illustrates a top view of an exemplary embodiment of a frame assembly, according to the presently disclosed systems, methods, and/or apparatuses.
Figure 20:
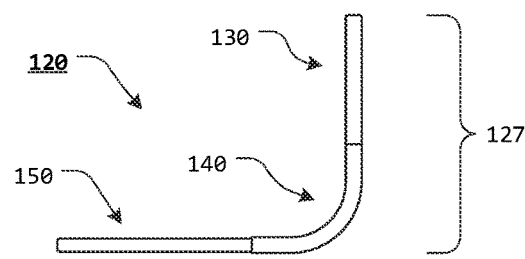
FIG. 20 illustrates a side view of an exemplary embodiment of a frame assembly, according to the presently disclosed systems, methods, and/or apparatuses.
Figure 21:
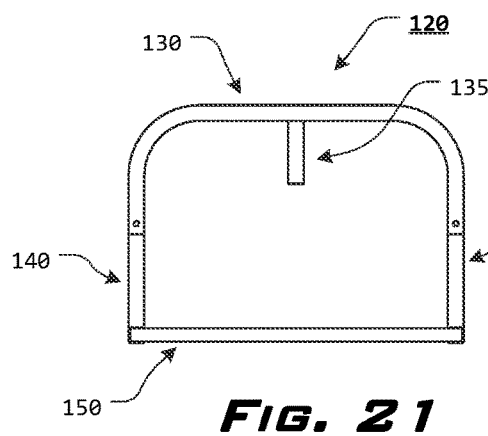
FIG. 21 illustrates a front view of an exemplary embodiment of a frame assembly, according to the presently disclosed systems, methods, and/or apparatuses.
Figure 22:
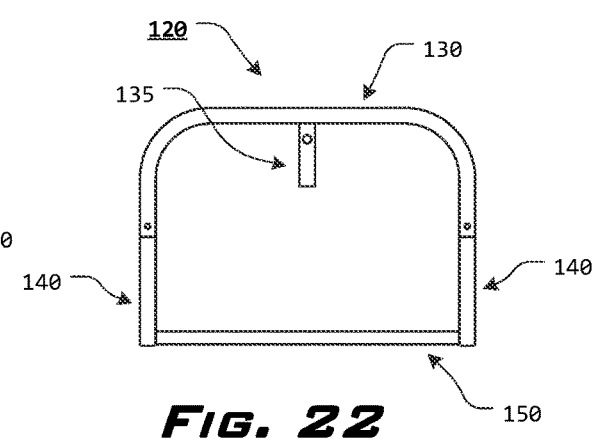
FIG. 22 illustrates a rear view of an exemplary embodiment of a frame assembly, according to the presently disclosed systems, methods, and/or apparatuses.
Figure 23:
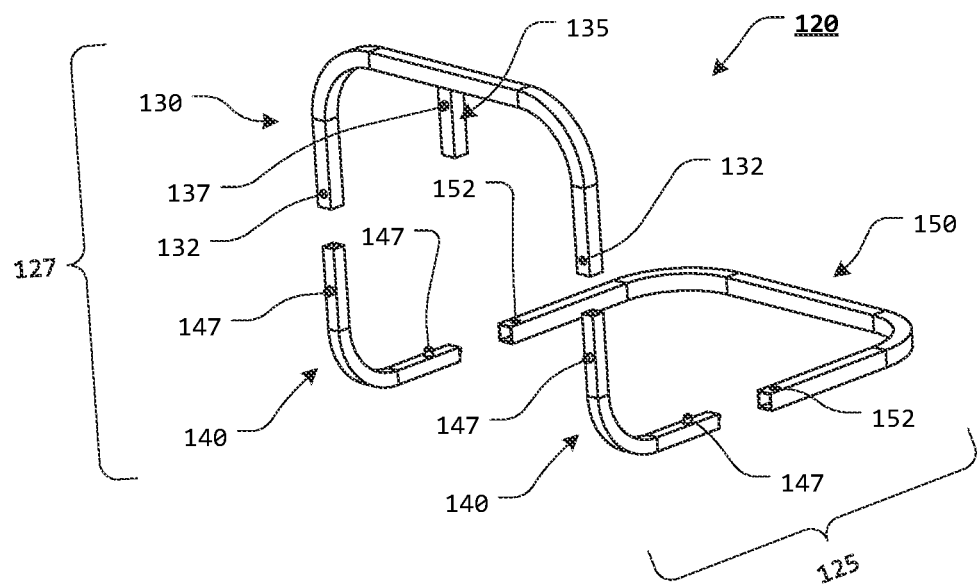
FIG. 23 illustrates an upper, rear, left, exploded perspective view of certain exemplary components of an exemplary embodiment of a frame assembly, according to the presently disclosed systems, methods, and/or apparatuses.
Figure 24:
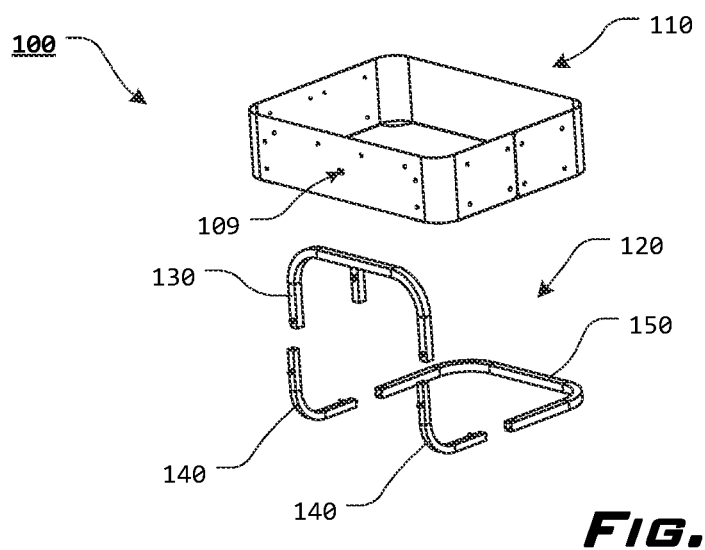
FIG. 24 illustrates an upper, rear, left, exploded perspective view of certain exemplary components of an exemplary embodiment of a frame assembly, wherein the frame assembly is at least partially aligned with an exemplary pet bed, according to the presently disclosed systems, methods, and/or apparatuses.
Figure 25:
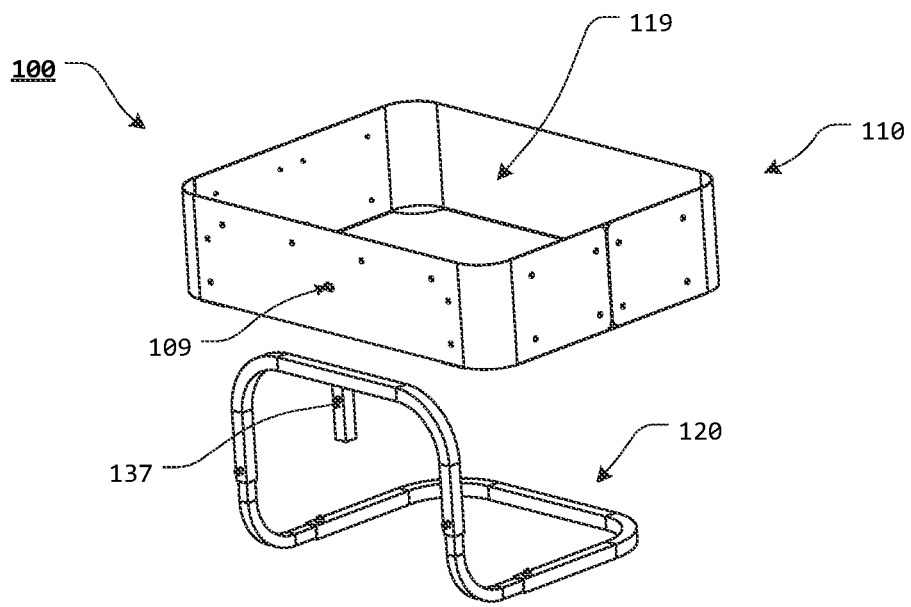
FIG. 25 illustrates an upper, rear, left, perspective view of certain exemplary components of an exemplary embodiment of a frame assembly, wherein the frame assembly is at least partially aligned with an exemplary pet bed, according to the presently disclosed systems, methods, and/or apparatuses.
Figure 26:
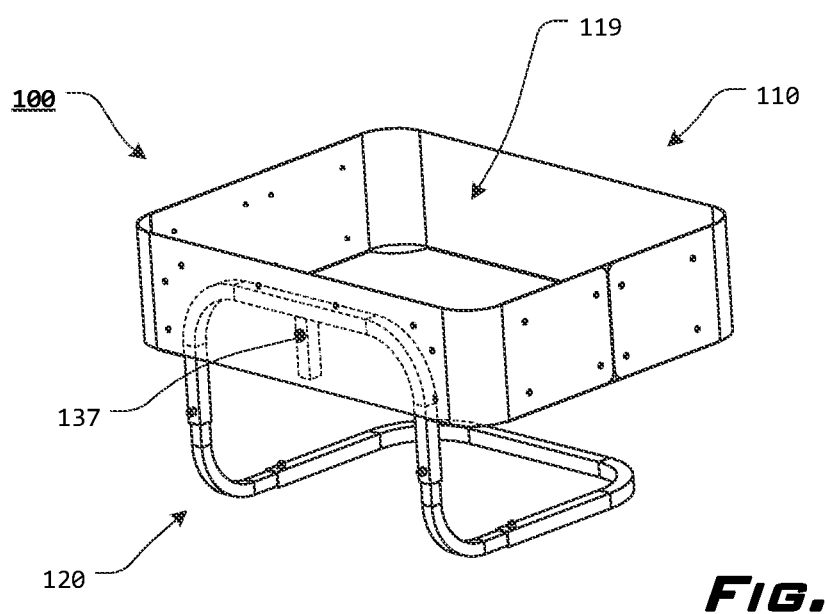
FIG. 26 illustrates an upper, rear, left, perspective view of certain exemplary components of an exemplary embodiment of a frame assembly, wherein an exemplary pet bed is releasably attached or coupled to an exemplary frame assembly, according to the presently disclosed systems, methods, and/or apparatuses.
Figure 27:
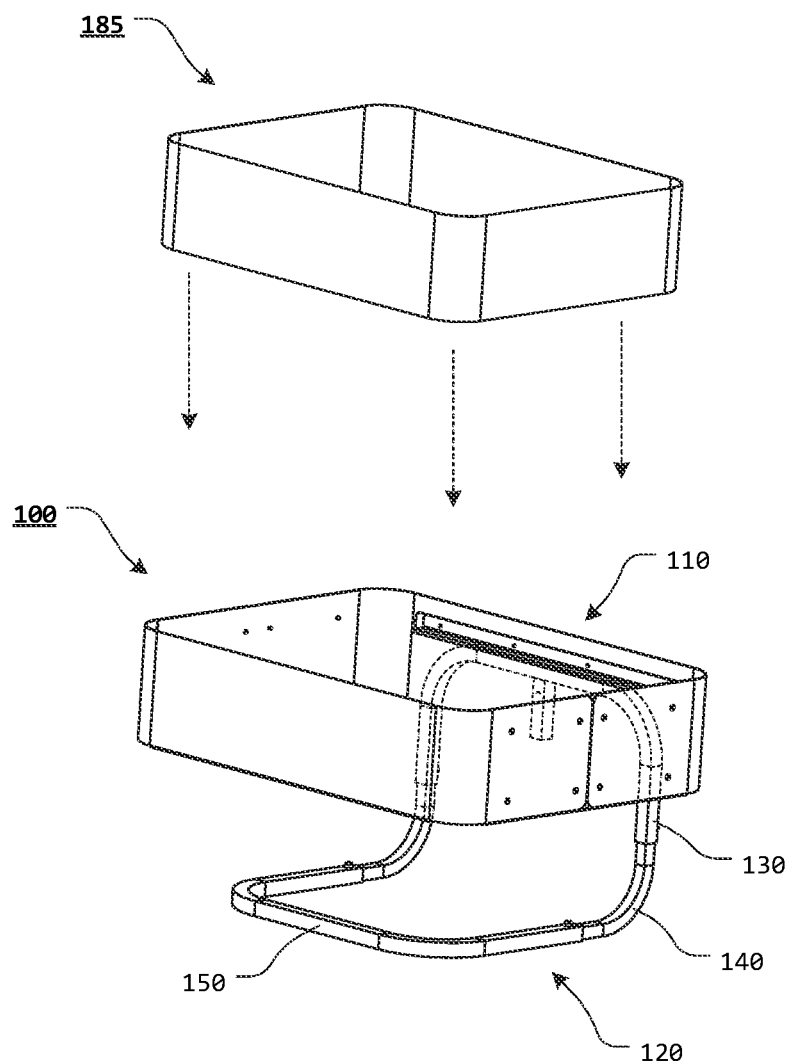
FIG. 27 illustrates an upper, rear, left, perspective view of certain exemplary components of an exemplary embodiment of a frame assembly, wherein an exemplary pet bed is releasably attached or coupled to an exemplary frame assembly and wherein an exemplary pet bedliner is aligned with the exemplary pet bed, according to the presently disclosed systems, methods, and/or apparatuses.

During use of the portable pet bed assembly 100, as illustrated most clearly in FIGS. 10-12, the pet bed 110 may be repeatably slidably releasably attached or coupled to the bed mount 130 of the frame assembly 120 by initially aligning the bed mount 130 with the bed frame recess aperture 109. As at least a portion of the bed mount 130 is urged through the bed frame recess aperture 109 and inserted into the bed frame recess 117 of the portable pet bed assembly 100, the bed mount 130 is guided into position by at least some portion of the pet bed 110, such as, for example, the interior side walls of the pet bed bracket 116 and the bed frame recess 117.

As the bed mount 130 is inserted further into the bed frame recess 117, at least a portion of the bed mount 130 will slide adjacent or against the interior side walls forming the bed frame recess 117 and a portion of the outer surface of the bed mount attachment projection 137 of the bed mount 130 will contact an interior side wall forming the bed frame recess 117. The size and/or shape of at least a portion of the interior side wall of the bed frame recess 117 allows at least a portion of the bed mount attachment projection 137 to ride along the surface of the interior side wall of the bed frame recess 117 and apply a force to urge the bed mount attachment projection 137 toward the disengaged position, wherein the bed mount attachment projection 137 is at least partially retracted within the associated bed mount attachment aperture 132, so as to allow the bed mount 130 to continue to be inserted into the bed frame recess 117.

As the bed mount attachment projection 137 continues to ride along the surface of the interior side wall of the bed frame recess 117, the bias of the bed mount attachment projection 137 is overcome and the bed mount 130 is permitted to be seated in the bed frame recess 117. The bed mount 130 is prevented from moving in a lateral direction opposite the bed frame recess aperture 109 by the interior surfaces of the bed frame recess 117.

As the bed mount 130 is further seated into the bed frame recess 117, the bed mount 130 continues to travel from the bed frame recess opening 118 toward the top end 111, the interior surfaces of the bed frame recess 117 continue to displace the bed mount attachment projection 137, until the bed mount attachment projection 137 engages the bed frame recess aperture 109.

When the bed mount attachment projection 137 engages the bed frame recess aperture 109 the spring bias of the bed mount attachment projection 137 urges the bed mount attachment projection 137 to return to and engaged position, such that at least a portion of the bed mount attachment projection 137 is positioned within the bed frame recess aperture 109.

Once the portion of the bed mount 130 has been appropriately positioned within the bed frame recess 117, the bed mount attachment projection 137 of the bed mount 130 is aligned with the bed frame recess aperture 109 and at least a portion of the bed mount attachment projection 137 is spring biased to engage and protrude into or through at least a portion of the bed frame recess aperture 109.

While the bed mount 130 is fully seated in the bed frame recess 117 with the bed mount attachment projection 137 biased to the engaged position, removal of the bed mount 130 is not permitted, as the interaction between the bed mount attachment projection 137 and the bed frame recess aperture 109 does not allow the bed mount 130 to be withdrawn from the bed frame recess 117. When the bed mount 130 is secured in place, removal force applied to the bed mount 130 will not remove the bed mount 130 from the pet bed 110 unless the bed mount attachment projection 137 is urged so as to be brought out of the bed frame recess aperture 109.

To release the pet bed 110 from the bed mount 130, the bed mount attachment projection 137 is urged toward the disengaged position (typically by applying a force to the bed mount attachment projection 137 sufficient to overcome the biasing force of the bed mount attachment projection 137), by urging the bed mount attachment projection 137 out of contact with the bed frame recess aperture 109 and further within the bed mount attachment aperture 132.

As the bed mount attachment projection 137 is further urged toward the disengaged position, the bed mount attachment projection 137 is at least partially withdrawn from the bed frame recess aperture 109.

When the bed mount attachment projection 137 is no longer positioned within the bed frame recess aperture 109, the bed mount 130 will no longer be blocked by the bed mount attachment projection 137, the bed mount 130 can be withdrawn from the pet bed 110, and the pet bed 110 may be removed from the bed mount 130.

Figure 28:
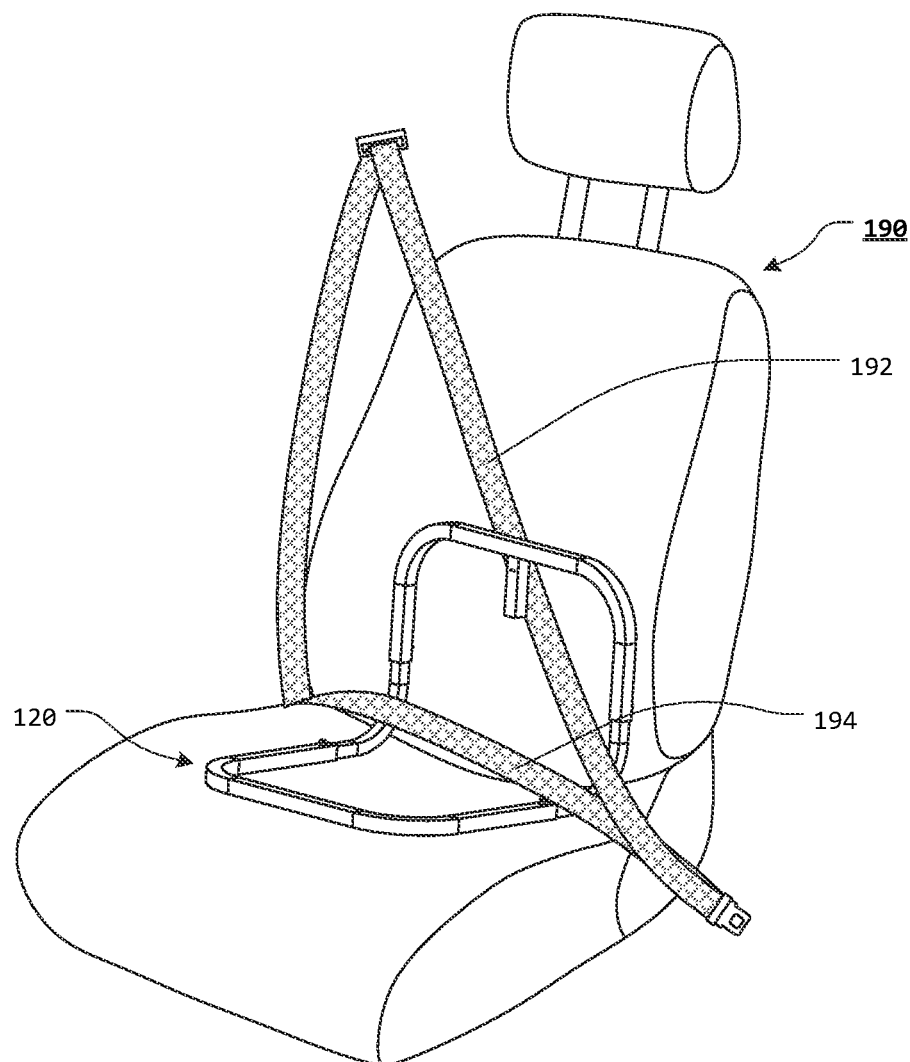
FIG. 28 illustrates an upper, front, right, perspective view of an exemplary embodiment of a frame assembly, wherein the frame assembly is releasably attached or coupled to a vehicle seat, according to the presently disclosed systems, methods, and/or apparatuses.
Figure 29:
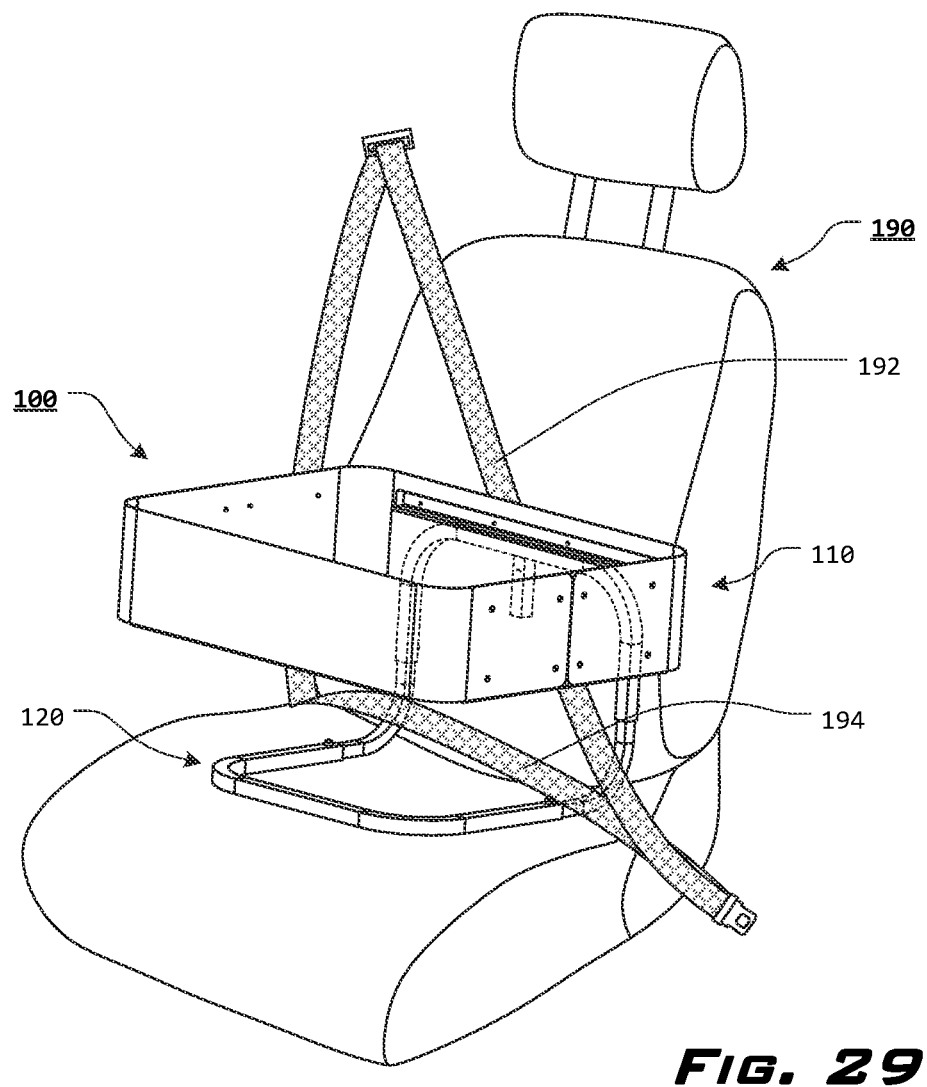
FIG. 29 illustrates an upper, front, right, perspective view of an exemplary embodiment of a frame assembly, wherein the frame assembly is releasably attached or coupled to a vehicle seat and wherein an exemplary pet bed is releasably attached or coupled to the exemplary frame assembly, according to the presently disclosed systems, methods, and/or apparatuses.
Figure 30:
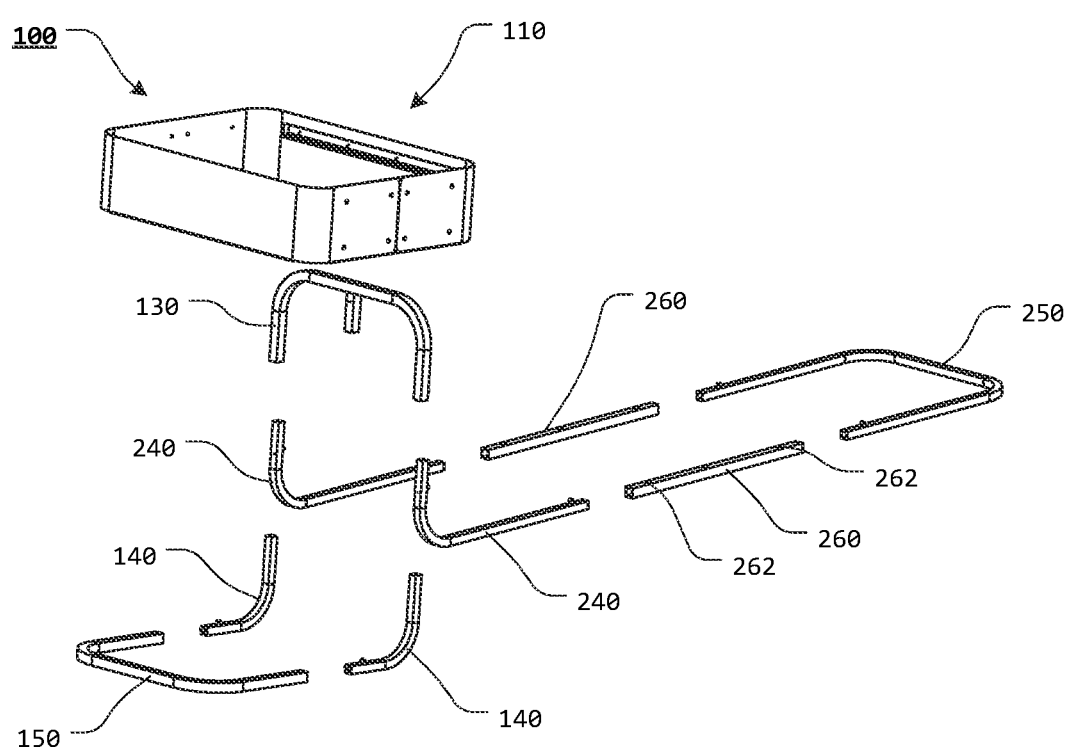
FIG. 30 illustrates an upper, front, right, exploded perspective view of certain exemplary components of exemplary embodiments of a frame assembly, wherein the frame assembly is at least partially aligned with an exemplary pet bed, according to the presently disclosed systems, methods, and/or apparatuses.
Figure 31:
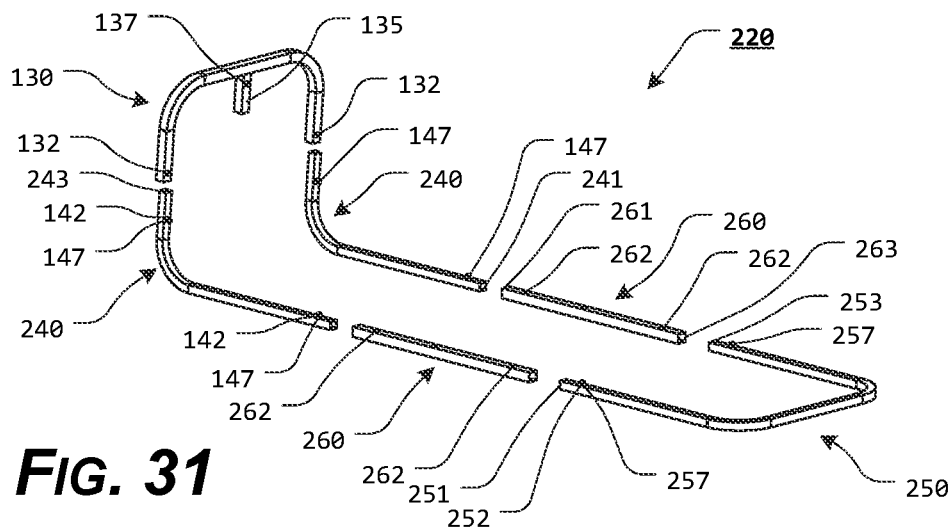
FIG. 31 illustrates an upper, rear, right, exploded perspective view of certain exemplary components of an exemplary embodiment of a frame assembly, according to the presently disclosed systems, methods, and/or apparatuses.
Figure 32:
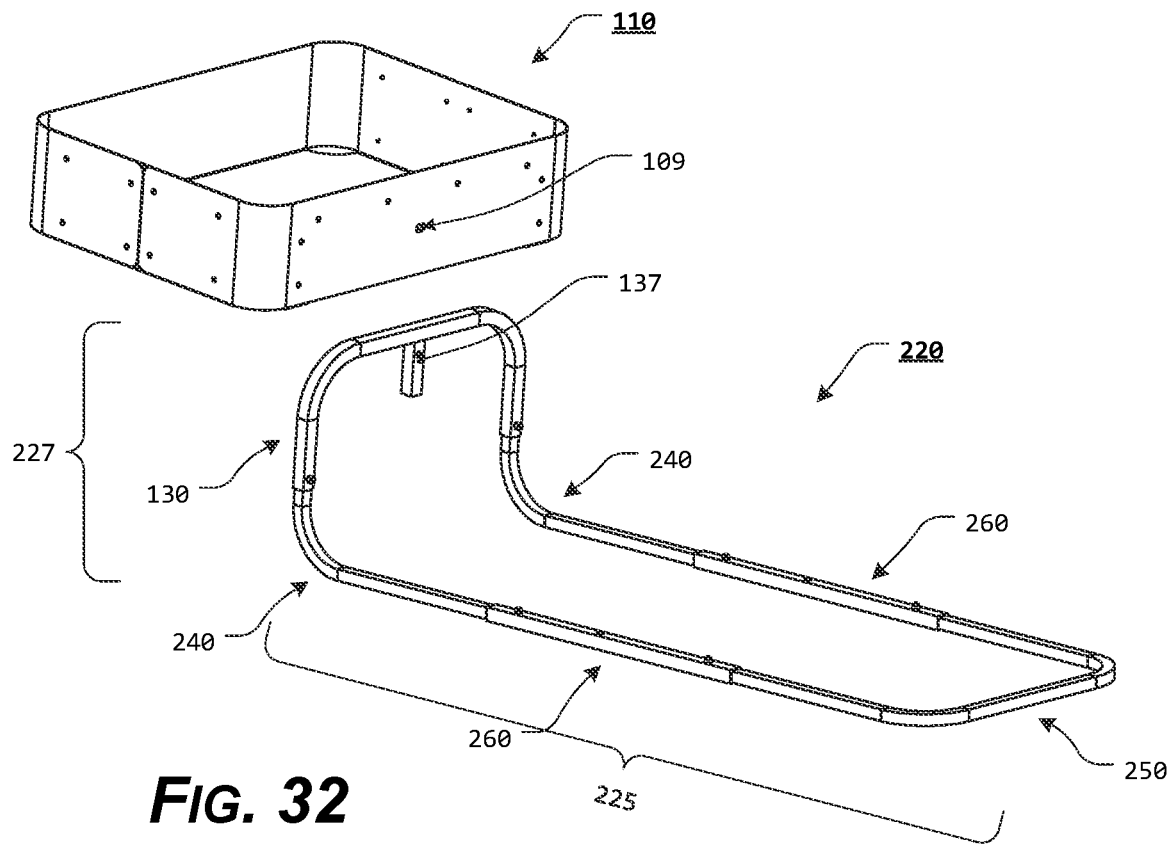
FIG. 32 illustrates an upper, rear, right, perspective view of certain exemplary components of an exemplary embodiment of a frame assembly, wherein the frame assembly is at least partially aligned with an exemplary pet bed, according to the presently disclosed systems, methods, and/or apparatuses.
Figure 33:
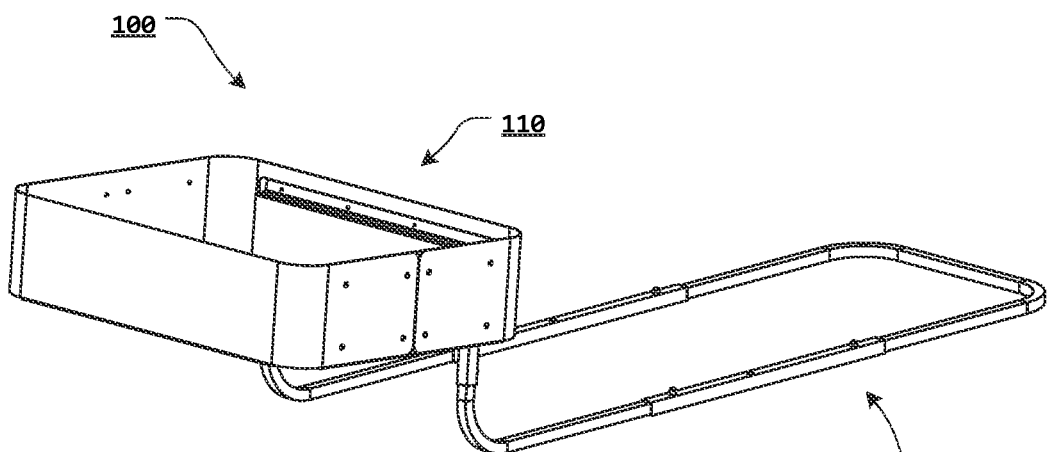
FIG. 33 illustrates an upper, front, right, perspective view of certain exemplary components of an exemplary embodiment of a frame assembly, wherein an exemplary pet bed is releasably attached or coupled to an exemplary frame assembly, according to the presently disclosed systems, methods, and/or apparatuses.
Figure 34:
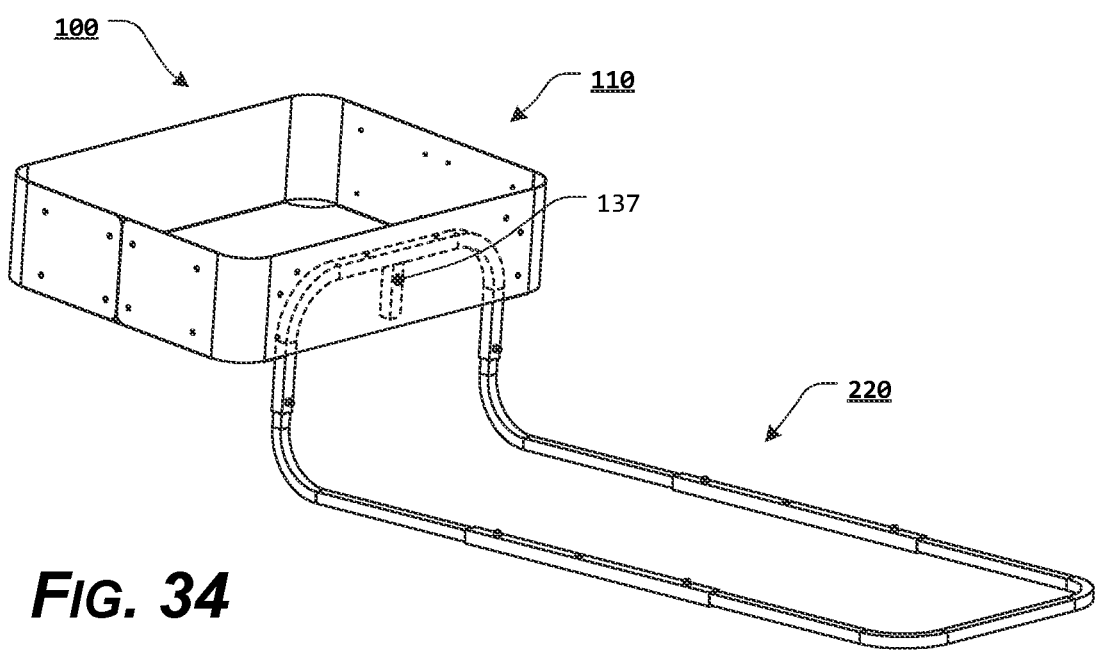
FIG. 34 illustrates an upper, rear, right, perspective view of certain exemplary components of an exemplary embodiment of a frame assembly, wherein an exemplary pet bed is releasably attached or coupled to an exemplary frame assembly, according to the presently disclosed systems, methods, and/or apparatuses.

In certain exemplary embodiments, as illustrated, for example, in FIGS. 28-29, the portable pet bed assembly 100 may be utilized in conjunction with a vehicle seat 190. In these exemplary embodiments, the frame assembly 120 is releasably secured to a portion of the vehicle seat 190, by interaction of the frame assembly 120 and the shoulder belt 192 and/or lap belt 194 associated with the vehicle seat 190. In certain exemplary embodiments, the frame assembly 120 is releasably secured to the vehicle seat 190 by interweaving at least a portion of the shoulder belt 192 between one or more portions of the bed mount 130 and at least one elbow 140 and interweaving at least a portion of the lap belt 194 over portions of two elbows 140.

When the frame assembly 120 is secured to the vehicle seat 190, the pet bed 110 may be repeatably slidably releasably attached or coupled to the frame assembly 120, as described herein. In this manner, the pet bed 110 may be attached or coupled to the frame assembly 120 to allow a pet to ride in a vehicle. The pet bed 110 may then be released from the frame assembly 120 to remove the pet bed 110 from the vehicle. The frame assembly 120 may remain secured to the vehicle seat 190 or may be removed from the vehicle seat 190 at the discretion of the user.

FIGS. 30-36 illustrate certain alternative exemplary elements and/or aspects of exemplary embodiments of a portable pet bed assembly 100, according to the present disclosure. As illustrated in FIGS. 30-36, the portable pet bed assembly 100 comprise a pet bed 110, a frame assembly 220, a bed mount 130, elbows 240, and a base 250.

It should be appreciated that these elements correspond to and operate similarly to the pet bed 110, the frame assembly 120, the bed mount 130, the elbows 140, and the base 150, as described herein, with reference to the portable pet bed assembly 100.

However, as illustrated in FIGS. 30-36, certain features and/or aspects of the elbows 240 and the base 250 vary slightly from the elbows 140 and the base 150. For example, elbows 240 extend from a proximal end 241 to a distal end 243. As illustrated in FIGS. 1-29, one or more portions of the elbows 140 (either a portion of the elbow proximal end 141 or a portion of the elbow distal end 143) may be lengthened to form an elbow 240. Thus, for example, elbow leg portions of each elbow 140 may be substantially equal length, as illustrated, for example, in FIGS. 1-29. Alternatively, one of the elbow leg portions of each elbow 240 may be longer than the other elbow leg portion, as illustrated, for example, in FIGS. 30-36.

Optionally, one or more elongate extension portions 260 may be included. If included, each extension portion 260 extends from a proximal end 261 to a distal end 263. An extension aperture 262 is formed through at least one side wall of the extension portion 260 proximate the proximal end 261 and the distal end 263 of each extension portion 260. Each extension aperture 262 is formed such that if a portion of a terminal end of an elbow 240 or a portion of a terminal end of the base 250 is appropriately seated within the extension portion 260, an elbow attachment projection 147 of the elbow 240 is aligned with the extension aperture 262. In this manner, if a portion of the elbow 240 is appropriately seated within the extension portion 260 at least a portion of an elbow attachment projection 147 is able to engage and protrude into or through at least a portion of the extension aperture 262. Interaction between the elbow attachment projection 147 and the extension aperture 262 impedes or prevents withdrawal of the extension portion 260 from the elbow 240.

Optionally, the base 150 may be modified to form the base 250. A base attachment aperture 252 is formed through at least one side wall of the base 250 proximate a terminal end portion of the base first end 251 and the base second end 253.

In various exemplary embodiments, at least a portion of the base attachment projection 257 extends through each base attachment aperture 252. In various exemplary, nonlimiting embodiments, the base attachment projection 257 comprises a spring biased button and the extension apertures 262 of the extension portion 260 provide a corresponding hole to provide a releasable locking arrangement between the base 250 and the extension portion 260.

Each base attachment aperture 252 is formed such that if a portion of a terminal end of a base 250 is appropriately seated within a corresponding distal end 263 of the extension portion 260, a base attachment aperture 252 of the base 250 is aligned with an extension aperture 262 of the extension portion 260. In this manner, if a portion of the base 250 is appropriately seated within the extension portion 260 at least a portion of a base attachment projection 257 is able to at least partially protrude from a corresponding base attachment aperture 252 and engage and protrude into or through at least a portion of the aligned extension aperture 262 of the extension portion 260.

In various exemplary, nonlimiting embodiments, each base attachment projection 257 comprises a spring biased button and each associated extension aperture 262 of the extension portion 260 provides a corresponding hole to provide a releasable locking arrangement between an associated base attachment projection 257 of the base 250 and the extension portion 260. Interaction between the base attachment projection 257 and the associated extension aperture 262 impedes or prevents withdrawal of the base 250 from the extension portion 260.

As illustrated most clearly in FIGS. 30-34, the frame assembly 220 is slidably repeatably releasably assembled in a similar fashion to the assembly of the frame assembly 120. The frame assembly 220 is assembled by slidably repeatably releasably attaching or coupling the respective distal ends 243 of the elbows 240 to the bed mount 130. A proximal end 261 of each extension portion 260 is then repeatably slidably releasably attached or coupled to a respective proximal end 241 of an elbow 240. The base first end 251 and the base second end 253 of the base 250 are each repeatably slidably releasably attached or coupled to a respective distal end 263 of an extension portion 260.

When the frame assembly 220 has been assembled, the pet bed 110 may be repeatably releasably attached or coupled to the bed mount 130 of the frame assembly 220, as described with respect to the attachment or coupling of the pet bed 110 to the frame assembly 120.

Figure 35:
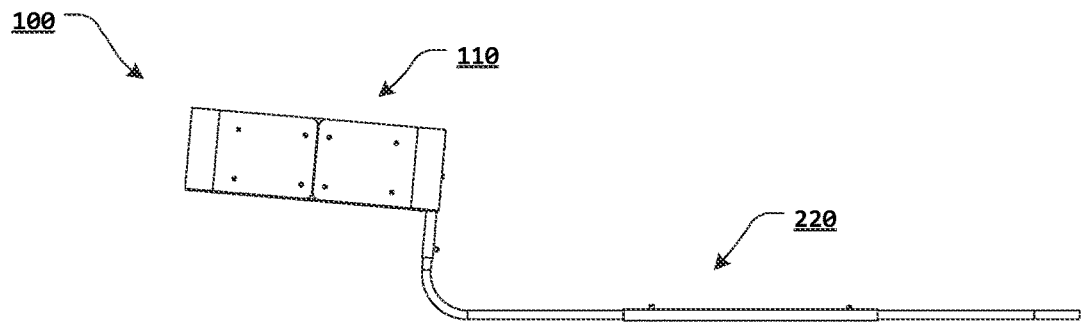
FIG. 35 illustrates a side view of an exemplary embodiment of a pet bed assembly, according to the presently disclosed systems, methods, and/or apparatuses.
Figure 36:
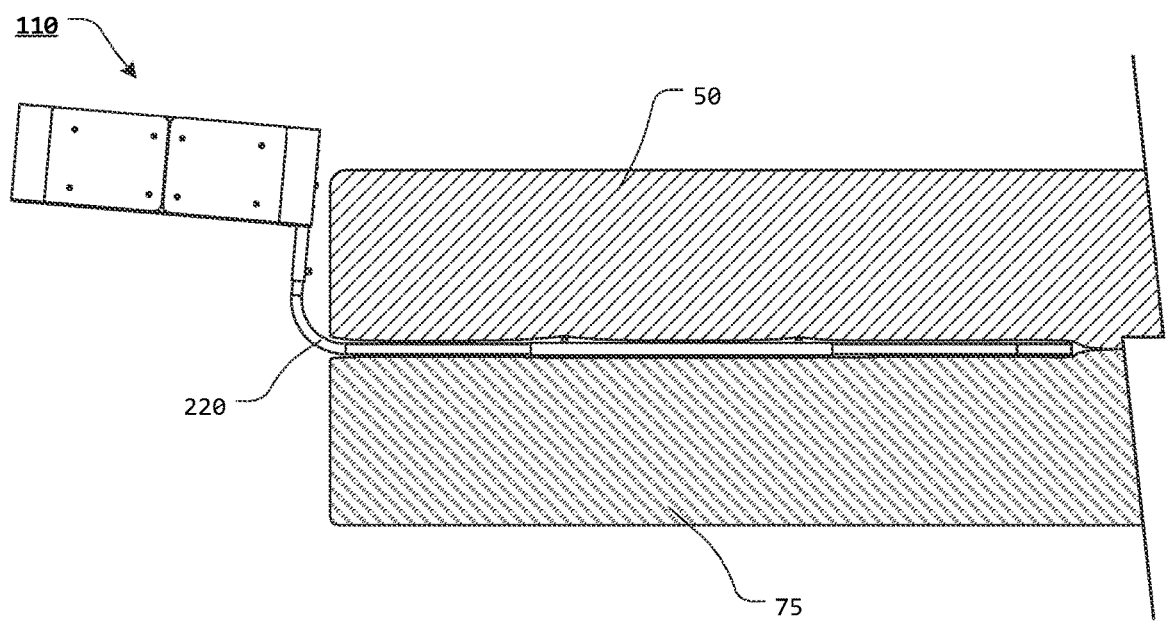
FIG. 36 illustrates a side view of an exemplary embodiment of a pet bed assembly, wherein the frame assembly is positioned between an exemplary mattress and box springs, according to the presently disclosed systems, methods, and/or apparatuses.

As illustrated most clearly in FIGS. 35-36, a portion of the frame assembly 220 may optionally be positioned between a mattress support 75 and a mattress 50. More specifically, the base 250, the extension portions 260, and at least a portion of the elbows 240 are positioned between the mattress support 75 and the mattress 50. By positioning portions of the frame assembly 220 between the positioned between the mattress support 75 and the mattress 50, the pet bed 110 may be attached or coupled to the frame assembly 220 and positioned adjacent the mattress 50. Depending on the size and shape of the elbows 240 and/or the bed mount 130, the pet bed 110 may optionally be positioned at a height that is below, substantially coplanar with, or above a top surface of the mattress 50.

While the presently disclosed systems, methods, and/or apparatuses has been described in conjunction with the exemplary embodiments outlined above, the foregoing description of exemplary embodiments of the presently disclosed systems, methods, and/or apparatuses, as set forth above, are intended to be illustrative, not limiting and the fundamental disclosed systems, methods, and/or apparatuses should not be considered to be necessarily so constrained. It is evident that the presently disclosed systems, methods, and/or apparatuses is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the presently disclosed systems, methods, and/or apparatuses, subject to any specifically excluded limit in the stated range. Where the stated range includes one or both of the limits, ranges excluding either or both of those included limits are also included in the presently disclosed systems, methods, and/or apparatuses.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the presently disclosed systems, methods, and/or apparatuses and elements or methods similar or equivalent to those described herein can be used in practicing the presently disclosed systems, methods, and/or apparatuses. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A portable pet bed assembly, comprising:

a frame assembly including a bed mount, two elbows, and a base, wherein said bed mount comprises a bed mount connector portion having a pair of bed mount leg portions extending from opposing ends of said bed mount connector portion, wherein each of said bed mount leg portions extends such that a longitudinal axis of each bed mount leg portion extends substantially perpendicular to a longitudinal axis of said bed mount connector portion, wherein a bed mount attachment portion extends from a portion of said bed mount connector portion of said bed mount, between said bed mount leg portions of said bed mount, wherein at least a portion of a bed mount attachment projection extends through a bed mount connector aperture formed in said bed mount attachment portion of said bed mount, wherein each of said elbows extends from an elbow proximal end to an elbow distal end, wherein said elbow distal end of a first of said elbows is repeatably slidably releasably attached or coupled to a first respective opposing terminal end portion of said bed mount, wherein said elbow distal end of a second of said elbows is repeatably slidably releasably attached or coupled to a second respective opposing terminal end portion of said bed mount, wherein said base extends from a base first end to a base second end, wherein said elbow proximal end of said first of said elbows is repeatably slidably releasably attached or coupled to said base proximate said base first end, wherein said elbow proximal end of said second of said elbows is repeatably slidably releasably attached or coupled to said base proximate said base second end, and wherein said bed mount, said two elbows, and said base are assembled by slidably releasably attaching or coupling said respective elbow distal ends of said elbows to said bed mount and by slidably repeatably releasably attaching or coupling said respective elbow proximal ends of said elbows to said base; and a pet bed having pet bed side walls and a pet bed bottom wall, wherein each of said pet bed side walls extends from said pet bed bottom wall to a pet bed side wall top end, wherein a bed cavity is defined between said pet bed bottom wall and said pet bed side walls, wherein a bed frame recess opening is formed through a portion of said pet bed bottom wall so as to allow access to a bed frame recess through a portion of said pet bed bottom wall, wherein a pet bed bracket is positioned within a portion of said bed cavity proximate at least a portion of said bed frame recess opening, wherein said bed frame recess is at least partially defined between a portion of one of said pet bed side walls and an interior portion of said pet bed bracket, wherein at least a portion of said bed frame recess is shaped to repeatably slidably receive at least a portion of said bed mount of said frame assembly, through said bed frame recess opening, at least partially therein, wherein a bed frame recess aperture is formed through said pet bed side wall such that if a portion of said bed mount is urged through said bed frame recess aperture, said bed mount is guided into position relative to said bed frame recess by at least a portion of said interior side walls of said pet bed bracket and said bed frame recess, and wherein if a portion of said bed mount is appropriately seated within said bed frame recess, said bed mount attachment projection of said bed mount is aligned with said bed frame recess aperture such that at least a portion of said bed mount attachment projection is able to repeatably slidably protrude into or through at least a portion of said bed frame recess aperture such that interaction between said bed mount attachment projection and said bed frame recess aperture prohibits withdrawal of said portion of said bed mount from said bed frame recess.

2. The portable pet bed assembly of claim 1, wherein each of said bed mount, said two elbows, and said base comprise a portion of substantially rectangular tubular material.

3. The portable pet bed assembly of claim 1, wherein an elbow attachment aperture is formed through at least one side wall of said elbows proximate a terminal end portion of said elbow proximal end, wherein an elbow attachment aperture is formed through at least one side wall of said elbows proximate a terminal end portion of said elbow distal end, wherein a bed mount attachment aperture is formed through at least one side wall of said bed mount proximate each of said opposing terminal end portions of said bed mount, wherein each elbow attachment aperture is formed such that if a portion of a terminal end of one of said elbows is appropriately seated within said corresponding bed mount leg portion of said bed mount, one of said elbow attachment apertures of said elbow is aligned with one of said bed mount attachment apertures such that at least a portion of an elbow attachment projection is able to at least partially protrude from a corresponding one of said elbow attachment apertures and into or through at least a portion of said aligned one of said elbow attachment apertures and one of said bed mount attachment apertures to impede or prevent withdrawal of said elbow from said bed mount.

4. The portable pet bed assembly of claim 1, wherein a base attachment aperture is formed through at least one side wall of said base proximate a terminal end portion of said base first end and wherein a base attachment aperture is formed through at least one side wall of said base proximate a terminal end portion of said base second end, wherein each base attachment aperture is formed such that if a portion of a terminal end of said base is appropriately seated within said elbow proximal end of one of said elbows, said base attachment aperture of said base is aligned with an elbow attachment aperture of said elbow such that if a portion of said base is appropriately seated within said elbow at least a portion of an elbow attachment projection is able to at least partially protrude from a corresponding one of said elbow attachment apertures and into or through at least a portion of said aligned base attachment aperture of said base to impede or prevent withdrawal of said elbow from said base.

5. The portable pet bed assembly of claim 1, wherein each of said elbows provides a substantially 90° transition between said elbow proximal end and said elbow distal end.

6. The portable pet bed assembly of claim 1, wherein each of said elbows provides an obtuse or acute angular transition between said elbow proximal end and said elbow distal end.

7. The portable pet bed assembly of claim 1, wherein said base comprises a substantially U-shaped portion of material extending from said base first end to a base connector portion and from said base connector portion to said base second end.

8. The portable pet bed assembly of claim 1, wherein said elbow proximal end is sized and shaped so as to receive at least a portion of a terminal end portion of said base at least partially therein.

9. The portable pet bed assembly of claim 1, wherein said elbow distal end is sized and shaped so as to be at least partially received within at least a portion of a terminal end portion of each bed mount leg portion of said bed mount.

10. The portable pet bed assembly of claim 1, wherein adjacent pairs of said pet bed side walls are attached or coupled via a corner element.

11. The portable pet bed assembly of claim 1, wherein one or more interior portions of said bed frame recess are formed to contact at least a portion of an outer surface of said bed mount if said bed mount is at least partially inserted into said bed frame recess and further limit how far said bed mount is capable of being inserted into said portable pet bed assembly.

12. The portable pet bed assembly of claim 1, wherein said bed mount attachment projection comprises a spring biased button.

13. The portable pet bed assembly of claim 1, further comprising a pet bed liner, wherein said pet bed liner is sized and shaped so as to be nested within at least a portion of said bed cavity.

14. The portable pet bed assembly of claim 1, wherein interaction between said bed mount attachment projection and said bed frame recess aperture prohibits withdrawal of said portion of said bed mount from said bed frame recess unless said bed mount attachment projection is urged from said bed frame recess aperture.

15. A portable pet bed assembly, comprising:
a frame assembly including a bed mount, two elbows, and a base, wherein said bed mount comprises a bed mount connector portion having a pair of bed mount leg portions extending from opposing ends of said bed mount connector portion, wherein a bed mount attachment portion extends from a portion of said bed mount connector portion of said bed mount, wherein at least a portion of a bed mount attachment projection extends through a bed mount connector aperture formed in said bed mount attachment portion of said bed mount, wherein each of said elbows extends from an elbow proximal end to an elbow distal end, wherein said elbow distal end of a first of said elbows is slidably releasably attached or coupled to a first respective opposing terminal end portion of said bed mount, wherein said elbow distal end of a second of said elbows is slidably releasably attached or coupled to a second respective opposing terminal end portion of said bed mount, wherein said elbow proximal end of said first of said elbows is slidably releasably attached or coupled to said base proximate a base first end of said base, wherein said elbow proximal end of said second of said elbows is slidably releasably attached or coupled to said base proximate a base second end of said base, and wherein said bed mount, said two elbows, and said base are assembled by slidably releasably attaching or coupling said respective elbow distal ends of said elbows to said bed mount and by slidably repeatably releasably attaching or coupling said respective elbow proximal ends of said elbows to said base; and a pet bed having pet bed side walls and a pet bed bottom wall defining a bed cavity, wherein a bed frame recess opening is formed through a portion of said pet bed bottom wall so as to allow access to a bed frame recess through a portion of said pet bed bottom wall, wherein a pet bed bracket is positioned within a portion of the bed cavity, wherein said bed frame recess is at least partially defined between a portion of one of said pet bed side walls and an interior portion of said pet bed bracket, wherein at least a portion of said bed frame recess is shaped to repeatably slidably receive at least a portion of said bed mount of said frame assembly, through said bed frame recess opening, at least partially therein, wherein a bed frame recess aperture is formed through said pet bed side wall such that if a portion of said bed mount is urged through said bed frame recess aperture, said bed mount is guided into position relative to said bed frame recess by at least a portion of said interior side walls of said pet bed bracket and said bed frame recess, and wherein if a portion of said bed mount is appropriately seated within said bed frame recess, said bed mount attachment projection of said bed mount is aligned with said bed frame recess aperture such that at least a portion of said bed mount attachment projection is able to repeatably slidably protrude into or through at least a portion of said bed frame recess aperture such that interaction between said bed mount attachment projection and said bed frame recess aperture prohibits withdrawal of said portion of said bed mount from said bed frame recess.

16. The portable pet bed assembly of claim 15, wherein each of said bed mount, said two elbows, and said base comprise a portion of substantially rectangular tubular material.

17. The portable pet bed assembly of claim 15, wherein an elbow attachment aperture is formed through at least one side wall of said elbows proximate a terminal end portion of said elbow proximal end, wherein an elbow attachment aperture is formed through at least one side wall of said elbows proximate a terminal end portion of said elbow distal end, wherein a bed mount attachment aperture is formed through at least one side wall of said bed mount proximate each of said opposing terminal end portions of said bed mount, wherein each elbow attachment aperture is formed such that if a portion of a terminal end of one of said elbows is appropriately seated within said corresponding bed mount leg portion of said bed mount, one of said elbow attachment apertures of said elbow is aligned with one of said bed mount attachment apertures such that at least a portion of an elbow attachment projection is able to at least partially protrude from a corresponding one of said elbow attachment apertures and into or through at least a portion of said aligned one of said elbow attachment apertures and one of said bed mount attachment apertures to impede or prevent withdrawal of said elbow from said bed mount.

18. The portable pet bed assembly of claim 15, wherein a base attachment aperture is formed through at least one side wall of said base proximate a terminal end portion of said base first end and wherein a base attachment aperture is formed through at least one side wall of said base proximate a terminal end portion of said base second end, wherein each base attachment aperture is formed such that if a portion of a terminal end of said base is appropriately seated within said elbow proximal end of one of said elbows, said base attachment aperture of said base is aligned with an elbow attachment aperture of said elbow such that if a portion of said base is appropriately seated within said elbow at least a portion of an elbow attachment projection is able to at least partially protrude from a corresponding one of said elbow attachment apertures and into or through at least a portion of said aligned base attachment aperture of said base to impede or prevent withdrawal of said elbow from said base.

19. The portable pet bed assembly of claim 15, wherein interaction between said bed mount attachment projection and said bed frame recess aperture prohibits withdrawal of said portion of said bed mount from said bed frame recess unless said bed mount attachment projection is urged from said bed frame recess aperture.

20. A portable pet bed assembly, comprising:
a frame assembly including a bed mount, two elbows, and a base, wherein said bed mount comprises a bed mount connector portion having a pair of bed mount leg portions extending from opposing ends of said bed mount connector portion, wherein a bed mount attachment portion extends from a portion of said bed mount connector portion of said bed mount, wherein at least a portion of a bed mount attachment projection extends through a bed mount connector aperture formed in said bed mount attachment portion of said bed mount, wherein each of said elbows extends from an elbow proximal end to an elbow distal end, wherein said elbow distal end of a first of said elbows extends from a first respective opposing terminal end portion of said bed mount, wherein said elbow distal end of a second of said elbows extends from a second respective opposing terminal end portion of said bed mount, wherein said elbow proximal end of said first of said elbows extends from said base proximate a base first end of said base, wherein said elbow proximal end of said second of said elbows extends from said base proximate a base second end of said base, wherein said bed mount, said two elbows, and said base are assembled by slidably releasably attaching or coupling said respective elbow distal ends of said elbows to said bed mount and by slidably repeatably releasably attaching or coupling said respective elbow proximal ends of said elbows to said base, and wherein said frame assembly is formed of a unitary body or is a one-piece article; and
a pet bed having pet bed side walls and a pet bed bottom wall defining a bed cavity, wherein a bed frame recess opening is formed through a portion of said pet bed bottom wall so as to allow access to a bed frame recess through a portion of said pet bed bottom wall, wherein a pet bed bracket is positioned within a portion of the bed cavity, wherein said bed frame recess is at least partially defined between a portion of one of said pet bed side walls and an interior portion of said pet bed bracket, wherein at least a portion of said bed frame recess is shaped to repeatably slidably receive at least a portion of said bed mount of said frame assembly, through said bed frame recess opening, at least partially therein, wherein a bed frame recess aperture is formed through said pet bed side wall such that if a portion of said bed mount is urged through said bed frame recess aperture, said bed mount is guided into position relative to said bed frame recess by at least a portion of said interior side walls of said pet bed bracket and said bed frame recess, and wherein if a portion of said bed mount is appropriately seated within said bed frame recess, said bed mount attachment projection of said bed mount is aligned with said bed frame recess aperture such that at least a portion of said bed mount attachment projection is able to repeatably slidably protrude into or through at least a portion of said bed frame recess aperture such that interaction between said bed mount attachment projection and said bed frame recess aperture prohibits withdrawal of said portion of said bed mount from said bed frame recess unless said bed mount attachment projection is urged from said bed frame recess aperture.

* * * * *